(12) United States Patent
Smathers et al.

(10) Patent No.: US 11,341,330 B1
(45) Date of Patent: May 24, 2022

(54) APPLIED ARTIFICIAL INTELLIGENCE TECHNOLOGY FOR ADAPTIVE NATURAL LANGUAGE UNDERSTANDING WITH TERM DISCOVERY

(71) Applicant: Narrative Science Inc., Chicago, IL (US)

(72) Inventors: Michael Justin Smathers, Chicago, IL (US); Daniel Joseph Platt, Chicago, IL (US); Nathan D. Nichols, Chicago, IL (US); Jared Lorince, Skokie, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 188 days.

(21) Appl. No.: 16/744,562

(22) Filed: Jan. 16, 2020

Related U.S. Application Data

(60) Provisional application No. 62/797,787, filed on Jan. 28, 2019.

(51) Int. Cl.
| | |
|---|---|
| *G06F 40/284* | (2020.01) |
| *G06F 40/56* | (2020.01) |
| *G06F 40/44* | (2020.01) |
| *G06N 20/00* | (2019.01) |
| *G06K 9/62* | (2022.01) |
| *G06F 40/237* | (2020.01) |
| *G06F 40/216* | (2020.01) |

(52) U.S. Cl.
CPC .......... *G06F 40/284* (2020.01); *G06F 40/216* (2020.01); *G06F 40/237* (2020.01); *G06F 40/44* (2020.01); *G06F 40/56* (2020.01); *G06K 9/6256* (2013.01); *G06N 20/00* (2019.01)

(58) Field of Classification Search
CPC .......... G06F 40/00–58; G06F 16/3344; G06K 9/6256; G06N 20/00
USPC .......................... 704/1, 9, 10, 257, 270–275
See application file for complete search history.

(56) References Cited

U.S. PATENT DOCUMENTS

| | | |
|---|---|---|
| 4,992,939 A | 2/1991 | Tyler |
| 5,619,631 A | 4/1997 | Schott |
| (Continued) | | |

FOREIGN PATENT DOCUMENTS

| | | |
|---|---|---|
| WO | 9630844 A1 | 10/1996 |
| WO | 2006122329 A2 | 11/2006 |
| (Continued) | | |

OTHER PUBLICATIONS

Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
(Continued)

*Primary Examiner* — Jesse S Pullias
(74) *Attorney, Agent, or Firm* — Thompson Coburn LLP

(57) ABSTRACT

Disclosed herein is computer technology that provides adaptive mechanisms for learning concepts that are expressed by natural language sentences, and then applies this learning to appropriately classify new natural language sentences with the relevant concept that they express. The computer technology can also discover the uniqueness of terms within a training corpus, and sufficiently unique terms can be flagged for the user for possible updates to an ontology for the system.

20 Claims, 24 Drawing Sheets

(56) References Cited

U.S. PATENT DOCUMENTS

| | | |
|---|---|---|
| 5,687,364 A | 11/1997 | Saund et al. |
| 5,734,916 A | 3/1998 | Greenfield et al. |
| 5,802,495 A | 9/1998 | Goltra |
| 5,999,664 A | 12/1999 | Mahoney et al. |
| 6,006,175 A | 12/1999 | Holzrichter |
| 6,144,938 A | 11/2000 | Surace et al. |
| 6,278,967 B1 | 8/2001 | Akers et al. |
| 6,289,363 B1 | 9/2001 | Consolatti et al. |
| 6,757,362 B1 | 6/2004 | Cooper et al. |
| 6,771,290 B1 | 8/2004 | Hoyle |
| 6,917,936 B2 | 7/2005 | Cancedda |
| 6,968,316 B1 | 11/2005 | Hamilton |
| 6,976,031 B1 | 12/2005 | Toupal et al. |
| 6,976,207 B1 | 12/2005 | Rujan et al. |
| 7,027,974 B1 | 4/2006 | Busch et al. |
| 7,085,771 B2 | 8/2006 | Chung et al. |
| 7,089,241 B1 | 8/2006 | Alspector et al. |
| 7,191,119 B2 | 3/2007 | Epstein et al. |
| 7,246,315 B1 | 7/2007 | Andrieu et al. |
| 7,324,936 B2 | 1/2008 | Saldanha et al. |
| 7,333,967 B1 | 2/2008 | Bringsjord et al. |
| 7,496,567 B1 | 2/2009 | Steichen |
| 7,496,621 B2 | 2/2009 | Pan et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,756,810 B2 | 7/2010 | Nelken et al. |
| 7,778,895 B1 | 8/2010 | Baxter et al. |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 7,930,169 B2 | 4/2011 | Billerey-Mosier |
| 8,027,941 B2 | 9/2011 | Probst et al. |
| 8,046,226 B2 | 10/2011 | Soble et al. |
| 8,311,863 B1 | 11/2012 | Kemp |
| 8,355,903 B1 | 1/2013 | Birnbaum et al. |
| 8,355,904 B2 | 1/2013 | Lee |
| 8,374,848 B1 | 2/2013 | Birnbaum et al. |
| 8,447,604 B1 | 5/2013 | Chang |
| 8,458,154 B2 | 6/2013 | Eden et al. |
| 8,463,695 B2 | 6/2013 | Schiller |
| 8,494,944 B2 | 7/2013 | Schiller |
| 8,495,002 B2 | 7/2013 | Nelken et al. |
| 8,515,737 B2 | 8/2013 | Allen |
| 8,612,208 B2 | 12/2013 | Cooper et al. |
| 8,630,844 B1 | 1/2014 | Nichols et al. |
| 8,630,912 B2 | 1/2014 | Seki et al. |
| 8,630,919 B2 | 1/2014 | Baran et al. |
| 8,645,124 B2 | 2/2014 | Karov Zangvil |
| 8,676,691 B2 | 3/2014 | Schiller |
| 8,688,434 B1 | 4/2014 | Birnbaum et al. |
| 8,762,133 B2 | 6/2014 | Reiter |
| 8,762,134 B2 | 6/2014 | Reiter |
| 8,775,161 B1 | 7/2014 | Nichols et al. |
| 8,812,311 B2 | 8/2014 | Weber |
| 8,819,001 B1 * | 8/2014 | Zhang .................. G06F 40/40 707/723 |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,903,711 B2 | 12/2014 | Lundberg et al. |
| 8,909,645 B2 | 12/2014 | Eden et al. |
| 8,977,953 B1 | 3/2015 | Pierre et al. |
| 9,135,244 B2 | 9/2015 | Reiter |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,342,588 B2 | 5/2016 | Balchandran et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,424,254 B2 | 8/2016 | Howald et al. |
| 9,430,557 B2 | 8/2016 | Bhat et al. |
| 9,460,075 B2 | 10/2016 | Mungi et al. |
| 9,483,520 B1 | 11/2016 | Reiner et al. |
| 9,507,867 B2 * | 11/2016 | Johns .................. G06F 16/951 |
| 9,529,795 B2 | 12/2016 | Kondadadi et al. |
| 9,569,729 B1 | 2/2017 | Oehrle et al. |
| 9,576,009 B1 | 2/2017 | Hammond et al. |
| 9,697,178 B1 | 7/2017 | Nichols et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,773,166 B1 | 9/2017 | Connor et al. |
| 9,792,277 B2 | 10/2017 | Srinivasan |
| 9,870,629 B2 | 1/2018 | Cardno et al. |
| 9,971,967 B2 | 5/2018 | Bufe, III et al. |
| 9,977,773 B1 | 5/2018 | Birnbaum et al. |
| 9,990,337 B2 | 6/2018 | Birnbaum et al. |
| 10,019,512 B2 | 7/2018 | Boyle et al. |
| 10,037,377 B2 | 7/2018 | Boyle et al. |
| 10,049,152 B2 | 8/2018 | Ajmera et al. |
| 10,068,185 B2 | 9/2018 | Amershi et al. |
| 10,095,692 B2 | 10/2018 | Song et al. |
| 10,115,108 B1 | 10/2018 | Gendelev et al. |
| 10,185,477 B1 | 1/2019 | Paley et al. |
| 10,268,678 B2 | 4/2019 | Qiu et al. |
| 10,387,970 B1 | 8/2019 | Wang et al. |
| 10,489,488 B2 | 11/2019 | Birnbaum et al. |
| 10,565,308 B2 | 2/2020 | Reiter |
| 10,599,767 B1 | 3/2020 | Mattera et al. |
| 10,699,079 B1 | 6/2020 | Paley et al. |
| 10,706,236 B1 | 7/2020 | Platt et al. |
| 10,726,061 B2 | 7/2020 | Chu et al. |
| 10,755,042 B2 | 8/2020 | Birnbaum et al. |
| 10,762,304 B1 | 9/2020 | Paley et al. |
| 10,810,260 B2 | 10/2020 | Chen et al. |
| 10,956,656 B2 | 3/2021 | Birnbaum et al. |
| 10,963,649 B1 | 3/2021 | Sippel et al. |
| 10,990,767 B1 | 4/2021 | Smathers et al. |
| 11,003,866 B1 | 5/2021 | Sippel et al. |
| 11,023,689 B1 | 6/2021 | Sippel et al. |
| 11,030,408 B1 | 6/2021 | Meza et al. |
| 11,042,708 B1 | 6/2021 | Pham et al. |
| 11,042,709 B1 | 6/2021 | Pham et al. |
| 11,042,713 B1 | 6/2021 | Platt et al. |
| 11,055,497 B2 | 7/2021 | Noh et al. |
| 11,068,661 B1 | 7/2021 | Nichols et al. |
| 11,144,838 B1 | 10/2021 | Platt et al. |
| 11,170,038 B1 | 11/2021 | Platt et al. |
| 11,182,556 B1 | 11/2021 | Lewis Meza et al. |
| 11,188,588 B1 | 11/2021 | Platt et al. |
| 2002/0046018 A1 | 4/2002 | Marcu et al. |
| 2002/0083025 A1 | 6/2002 | Robarts et al. |
| 2002/0099730 A1 | 7/2002 | Brown et al. |
| 2002/0107721 A1 | 8/2002 | Darwent et al. |
| 2003/0004706 A1 | 1/2003 | Yale et al. |
| 2003/0061029 A1 | 3/2003 | Shaket |
| 2003/0212543 A1 | 11/2003 | Epstein et al. |
| 2003/0216905 A1 | 11/2003 | Chelba et al. |
| 2003/0217335 A1 | 11/2003 | Chung et al. |
| 2004/0015342 A1 | 1/2004 | Garst |
| 2004/0034520 A1 | 2/2004 | Langkilde-Geary et al. |
| 2004/0083092 A1 | 4/2004 | Valles |
| 2004/0093557 A1 | 5/2004 | Kawatani |
| 2004/0103116 A1 | 5/2004 | Palanisamy et al. |
| 2004/0138899 A1 | 7/2004 | Birnbaum et al. |
| 2004/0174397 A1 | 9/2004 | Cereghini et al. |
| 2004/0225651 A1 | 11/2004 | Musgrove et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |

(56) References Cited

U.S. PATENT DOCUMENTS

| | | |
|---|---|---|
| 2005/0033582 A1 | 2/2005 | Gadd et al. |
| 2005/0049852 A1 | 3/2005 | Chao |
| 2005/0125213 A1 | 6/2005 | Chen et al. |
| 2005/0137854 A1 | 6/2005 | Cancedda et al. |
| 2005/0273362 A1 | 12/2005 | Harris et al. |
| 2006/0031182 A1 | 2/2006 | Ryan et al. |
| 2006/0074634 A1 | 4/2006 | Gao et al. |
| 2006/0101335 A1 | 5/2006 | Pisciottano |
| 2006/0155662 A1 | 7/2006 | Murakami et al. |
| 2006/0181531 A1 | 8/2006 | Goldschmidt |
| 2006/0212446 A1 | 9/2006 | Hammond et al. |
| 2006/0253431 A1* | 11/2006 | Bobick ............. G06F 16/24522 |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2007/0294201 A1 | 12/2007 | Nelken et al. |
| 2008/0005677 A1 | 1/2008 | Thompson |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0312904 A1 | 12/2008 | Balchandran et al. |
| 2008/0312906 A1 | 12/2008 | Balchandran et al. |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0083288 A1 | 3/2009 | LeDain et al. |
| 2009/0116755 A1 | 5/2009 | Neogi et al. |
| 2009/0119095 A1 | 5/2009 | Beggelman et al. |
| 2009/0119584 A1 | 5/2009 | Herbst |
| 2009/0144608 A1 | 6/2009 | Oisel et al. |
| 2009/0175545 A1 | 7/2009 | Cancedda et al. |
| 2009/0248399 A1 | 10/2009 | Au |
| 2010/0146393 A1 | 6/2010 | Land et al. |
| 2010/0161541 A1 | 6/2010 | Covannon et al. |
| 2010/0325107 A1 | 12/2010 | Kenton et al. |
| 2011/0022941 A1 | 1/2011 | Osborne et al. |
| 2011/0040837 A1 | 2/2011 | Eden et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0288852 A1 | 11/2011 | Dymetman et al. |
| 2011/0295595 A1 | 12/2011 | Cao et al. |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0291007 A1 | 11/2012 | Bagheri et al. |
| 2012/0310699 A1 | 12/2012 | McKenna et al. |
| 2013/0013289 A1 | 1/2013 | Myaeng et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0138430 A1 | 5/2013 | Eden et al. |
| 2013/0144605 A1 | 6/2013 | Brager et al. |
| 2013/0145242 A1 | 6/2013 | Birnbaum et al. |
| 2013/0173285 A1 | 7/2013 | Hyde et al. |
| 2013/0174026 A1 | 7/2013 | Locke |
| 2013/0211855 A1 | 8/2013 | Eberle et al. |
| 2013/0226559 A1 | 8/2013 | Lim et al. |
| 2013/0238316 A1 | 9/2013 | Shastri et al. |
| 2013/0238330 A1 | 9/2013 | Casella Dos Santos |
| 2013/0246934 A1 | 9/2013 | Wade et al. |
| 2013/0253910 A1 | 9/2013 | Turner et al. |
| 2013/0262092 A1 | 10/2013 | Wasick |
| 2013/0268534 A1 | 10/2013 | Mathew et al. |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0040312 A1 | 2/2014 | Gorman et al. |
| 2014/0062712 A1 | 3/2014 | Reiter |
| 2014/0075004 A1 | 3/2014 | Van Dusen et al. |
| 2014/0134590 A1 | 5/2014 | Hiscock Jr. |
| 2014/0149107 A1 | 5/2014 | Schilder |
| 2014/0163962 A1 | 6/2014 | Castelli et al. |
| 2014/0173425 A1 | 6/2014 | Hailpern et al. |
| 2014/0200878 A1 | 7/2014 | Mylonakis et al. |
| 2014/0201202 A1 | 7/2014 | Jones et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0049951 A1 | 2/2015 | Chaturvedi et al. |
| 2015/0078232 A1 | 3/2015 | Djinki et al. |
| 2015/0120738 A1 | 4/2015 | Srinivasan |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0261745 A1 | 9/2015 | Song et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0347391 A1 | 12/2015 | Chen et al. |
| 2015/0347400 A1 | 12/2015 | Sripada |
| 2015/0347901 A1 | 12/2015 | Cama et al. |
| 2015/0356967 A1 | 12/2015 | Byron et al. |
| 2015/0363364 A1 | 12/2015 | Sripada |
| 2015/0370778 A1 | 12/2015 | Tremblay et al. |
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley et al. |
| 2016/0103559 A1 | 4/2016 | Maheshwari et al. |
| 2016/0132489 A1 | 5/2016 | Reiter |
| 2016/0140090 A1 | 5/2016 | Dale et al. |
| 2016/0162803 A1 | 6/2016 | Amershi et al. |
| 2016/0196491 A1 | 7/2016 | Chandrasekaran et al. |
| 2016/0217133 A1 | 7/2016 | Reiter et al. |
| 2016/0232152 A1 | 8/2016 | Mahamood |
| 2016/0232221 A1 | 8/2016 | McCloskey et al. |
| 2016/0314121 A1 | 10/2016 | Arroyo et al. |
| 2017/0004415 A1 | 1/2017 | Moretti et al. |
| 2017/0017897 A1 | 1/2017 | Bugay et al. |
| 2017/0024465 A1 | 1/2017 | Yeh et al. |
| 2017/0026705 A1 | 1/2017 | Yeh et al. |

(56) References Cited

U.S. PATENT DOCUMENTS

| | | |
|---|---|---|
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0091291 A1 | 3/2017 | Bostick et al. |
| 2017/0116327 A1 | 4/2017 | Gorelick et al. |
| 2017/0140405 A1 | 5/2017 | Gottemukkala et al. |
| 2017/0199928 A1 | 7/2017 | Zhao et al. |
| 2017/0212671 A1 | 7/2017 | Sathish et al. |
| 2017/0213157 A1 | 7/2017 | Bugay et al. |
| 2017/0242886 A1 | 8/2017 | Jolley et al. |
| 2017/0270105 A1 | 9/2017 | Ninan et al. |
| 2017/0293864 A1 | 10/2017 | Oh et al. |
| 2017/0358295 A1 | 12/2017 | Roux et al. |
| 2017/0371856 A1 | 12/2017 | Can et al. |
| 2018/0025726 A1 | 1/2018 | Gatti de Bayser et al. |
| 2018/0075368 A1 | 3/2018 | Brennan et al. |
| 2018/0082184 A1 | 3/2018 | Guo et al. |
| 2018/0114158 A1 | 4/2018 | Foubert et al. |
| 2018/0189284 A1 | 7/2018 | Hosabettu |
| 2018/0232443 A1 | 8/2018 | Delgo et al. |
| 2018/0232487 A1 | 8/2018 | Erard et al. |
| 2018/0232493 A1 | 8/2018 | Erard et al. |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0314689 A1 | 11/2018 | Wang et al. |
| 2019/0056913 A1* | 2/2019 | Jaroch ................ G06F 16/34 |
| 2019/0138615 A1 | 5/2019 | Huh et al. |
| 2019/0147849 A1 | 5/2019 | Talwar et al. |
| 2019/0197097 A1 | 6/2019 | Nagarajan et al. |
| 2019/0236140 A1 | 8/2019 | Canim et al. |
| 2019/0332666 A1 | 10/2019 | Dadachev et al. |
| 2019/0370696 A1 | 12/2019 | Ezen Can et al. |
| 2020/0074013 A1 | 3/2020 | Chen et al. |
| 2020/0074310 A1 | 3/2020 | Li et al. |
| 2020/0089735 A1 | 3/2020 | Birnbaum et al. |
| 2020/0134032 A1 | 4/2020 | Lin et al. |
| 2020/0160190 A1* | 5/2020 | Swamy ................ G06K 9/6262 |
| 2021/0192132 A1 | 6/2021 | Birnbaum et al. |
| 2021/0192144 A1 | 6/2021 | Paley et al. |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Character Writer Version 3.1, Typing Chimp Software LLC, 2012, screenshots from working program, pp. 1-19.

Cyganiak et al., "RDF 1.1 Concepts and Abstract Syntax", W3C Recommendation, 2014, vol. 25, No. 2.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

McKeown, K., Kukich, K., & Shaw, J. (1994). Practical issues in automatic documentation generation. 4th Conference an Applied Natural Language Processing, Stuttgart, Germany, pp. 7-14.

Meehan, James R., Tale-Spin. (1977). An Interactive Program that Writes Stories. In Proceedings of the Fifth International Joint Conference on Artificial Intelligence.

(56) References Cited

OTHER PUBLICATIONS

Memorandum Opinion and Order for O2 Media, *LLC v. Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Write Brothers, 2009, user manual.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.

Prosecution History for U.S. Appl. No. 16/444,649, now U.S. Pat. No. 10,706,236, filed Jun. 18, 2019.

Reiter et al., "Building Applied Natural Generation Systems", Cambridge University Press, 1995, pp. 1-32.

Reiter, E. (2007). An architecture for Data-To-Text systems. In: Busemann, Stephan (Ed.), Proceedings of the 11th European Workshop on Natural Language Generation, pp. 97-104.

Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.

Reiter, E., Sripada, S., Hunter, J., Yu, J., and Davy, I. (2005). Choosing words in computer-generated weather forecasts. Artificial Intelligence, 167:137-169.

Riedl et al., "From Linear Story Generation to Branching Story Graphs", IEEE Computer Graphics and Applications, 2006, pp. 23-31.

Riedl et al., "Narrative Planning: Balancing Plot and Character", Journal of Artificial Intelligence Research, 2010, pp. 217-268, vol. 39.

Robin, J. (1996). Evaluating the portability of revision rules for incremental summary generation. Paper presented at Proceedings of the 34th Annual Meeting of the Association for Computational Linguistics (ACL'96), Santa Cruz, CA.

Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.

Smith, "The Multivariable Method in Singular Perturbation Analysis", SIAM Review, 1975, pp. 221-273, vol. 17, No. 2.

Sripada, S., Reiter, E., and Davy, I. (2003). SumTime-Mousam: Configurable Marine Weather Forecast Generator. Expert Update 6(3):4-10.

Storyview, Screenplay Systems, 2000, user manual.

Theune, M., Klabbers, E., Odijk, J., dePijper, J., and Krahmer, E. (2001) "From Data to Speech: A General Approach", Natural Language Engineering 7(1): 47-86.

Thomas, K., and Sripada, S. (2007). Atlas.txt: Linking Geo-referenced Data to Text for NLG. Paper presented at Proceedings of the 2007 European Natural Language Generation Workshop (ENLGO7).

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Office Action for U.S. Appl. No. 16/744,537 dated Aug. 3, 2021.

\* cited by examiner

- Sentence 1 (labeled with Concept X)
- Sentence 2 (labeled with Concept Y)

...

- Sentence N (labeled with Concept Z)

"Sales increased by 5% after manufacturing output grew to 500,000 units"

⬇ 502

```
[
  {
    "modifiers": [
      {
        "modifiers": [],
        "POS_coarse": "NOUN",
        "word": "Sales"
      },
      {
        "modifiers": [
          {
            "modifiers": [],
            "POS_coarse": "NOUN",
            "word": "5 %"
          }
        ],
        "POS_coarse": "ADP",
        "word": "by",
      },
      {
        "modifiers": [
          {
            "modifiers": [],
            "POS_coarse": "ADP",
            "word": "after",
          },
          {
            "modifiers": [
              {
                "modifiers": [],
                "POS_coarse": "VERB",
                "word": "manufacturing",
              }
            ],
```

```
            "POS_coarse": "VERB",
            "word": "manufacturing",
          }
        ],
        "POS_coarse": "NOUN",
        "word": "output",
      },
      {
        "modifiers": [
          {
            "modifiers": [
              {
                "modifiers": [],
                "POS_coarse": "NUM",
                "word": "500,000",
              }
            ],
            "POS_coarse": "NOUN",
            "word": "units",
          }
        ],
        "POS_coarse": "ADP",
        "word": "to",
      }
    ],
    "POS_coarse": "VERB",
    "word": "grew",
  }
],
"POS_coarse": "VERB",
"word": "increased",
  }
]
```

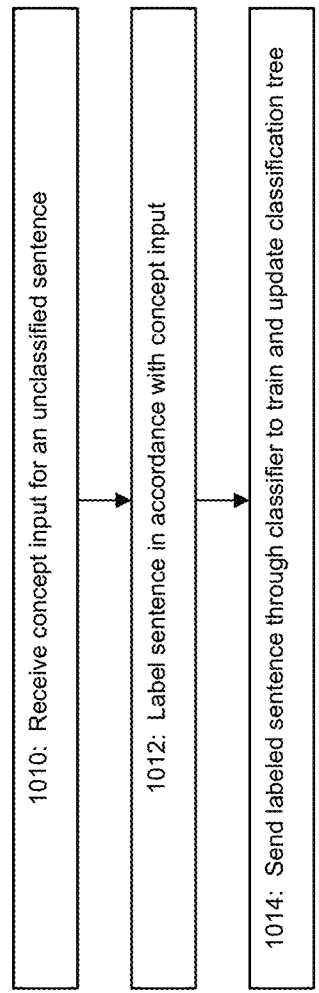

APPLIED ARTIFICIAL INTELLIGENCE TECHNOLOGY FOR ADAPTIVE NATURAL LANGUAGE UNDERSTANDING WITH TERM DISCOVERY

CROSS-REFERENCE AND PRIORITY CLAIM TO RELATED PATENT APPLICATIONS

This patent application claims priority to U.S. provisional patent application Ser. No. 62/797,787, filed Jan. 28, 2019, and entitled "Applied Artificial Intelligence Technology for Adaptive Natural Language Understanding", the entire disclosure of which is incorporated herein by reference.

This patent application is also related to (1) U.S. patent application Ser. No. 16/744,504, filed this same day, and entitled "Applied Artificial Intelligence Technology for Adaptive Natural Language Understanding", and (2) U.S. patent application Ser. No. 16/744,537, filed this same day, and entitled "Applied Artificial Intelligence Technology for Adaptively Classifying Sentences Based on the Concepts They Express to Improve Natural Language Understanding", the entire disclosures of each of which are incorporated herein by reference.

INTRODUCTION

Natural language processing (NLP) is a subfield of artificial intelligence (AI) concerned with technology that interprets natural language inputs. Natural language understanding (NLU) is a subfield of NLP, where NLU is concerned with technology that interprets natural language inputs. There is an ever-growing need in the art for improved NLU technology.

One of the pressing challenges in NLP and NLU is how to machine-recognize higher level meanings that are present within a natural language input. In many instances, when an AI system is deciding on how to best respond to a given natural language input, it is helpful that the AI system be able to recognize the higher level meaning of that input before it can respond appropriately. For example, if the AI system includes a natural language generation (NLG) component that produces a natural language output in response to the natural language input, it will be helpful for the NLG component to know the higher level meanings associated with natural language inputs when deciding what information should be presented to a user. NLG is a subfield of artificial intelligence (AI) concerned with technology that produces language as output on the basis of some input information or structure (e.g., where the input constitutes data about a situation to be analyzed and expressed in natural language).

The inventors disclose a number of technical innovations in the NLU arts that provide adaptive mechanisms for learning concepts that are expressed by natural language sentences, and then apply this learning to appropriately classify new natural language sentences with the relevant concepts that they express.

In an example embodiment, a training process operates on concept-labeled sentences and employs new rules that discriminate between different concepts based on sentence composition structure. Different concepts can have their own associated set of rules that are used by a classifier to then classify new sentences as either expressing a known concept or being unclassified.

In an example embodiment, unclassified sentences can be analyzed based on defined criteria such as their root verbs to form clusters of unclassified sentences. These sentence clusters can then be reviewed manually by users to assess if there any commonalities that would facilitate further classification by users.

In another example embodiment, the terms used in sentences can be analyzed to assess their uniqueness relative to a training corpus for the system. Terms with high uniqueness scores can then be reviewed through user interfaces, and mechanisms can be provided for adding selected terms to an ontology for the system if a user deems such an addition to be appropriate.

Example embodiments also disclose various user interfaces for reviewing and adapting how the system classifies sentences and updates the ontology. For example, concept classifications can be added to unclassified sentences in response to user inputs through the user interfaces; and newly classified sentences can then be used to re-train the classifier to adapt the system to better determine appropriate concept classifications for documents.

Further still, by using NLU as described herein to learn how different concepts are expressed in natural language, an AI system can use this information to improve how an NLG system produces natural language outputs that express such concepts.

For example, the term discovery mechanisms described herein can be used to populate and teach the NLG system's ontology about new entity types and/or new expressions for existing entity types. In doing so, the NLU techniques described herein can be used to improve the language output of an NLG system.

As another example, the NLG system may use NLG templates to produce language output that expresses a given concept, and these NLG templates may have counterparts in the concepts recognized by the NLU system described herein (where these NLU concepts have corresponding discrimination rules used by the NLU system to recognize such concepts in documents). The NLG templates can then be linked to the discrimination rules described herein that that share the same concepts, and these linked NLG templates can then be prioritized by the NLG system to be selected more frequently when producing language outputs in order to structure any language output in a manner that conforms to the NLU-recognized concept expressions. An example of an approach to link NLG templates with discrimination rules would be to generate a set of all tokens in all discrimination rules for a concept (Set A), generate a set of all tokens in each NLG template for a concept (Set B), and then perform a set intersection operation (A∩B) for each NLG template. The largest set resulting from the intersection would then be selected to link the subject NLG template with the subject discrimination rules. Also, if desired, a weighting mechanism could also be employed whereby if the same token is present in multiple discrimination rules this would result in set intersections which contain that token would be weighted more heavily than others.

As yet another example, the NLU techniques described herein that recognize and develop rules for recognizing concepts expressed by natural language sentences can be linked with additional NLG training techniques whereby an NLG system is trained to produce language output that resembles training inputs. An example of such an NLG training system is described in U.S. patent application 62/691,197 (entitled "Applied Artificial Intelligence for Using Natural Language Processing to Train a Natural Language Generation System", filed Jun. 28, 2018) (see also U.S. patent application Ser. No. 16/444,649 (entitled "Applied Artificial Intelligence Technology for Using Natural Language Processing and Concept Expression Templates to Train a Natural Language Generation System", filed Jun. 18, 2019, now U.S. Pat. No. 10,706,236)), each referenced below. The NLU system described herein can be used to recognize and tag input sentences with given concepts, and a decision can then be made as to what concepts and which concept-tagged sentences should be used to train the NLG system. Thus, one or more of the concept-tagged sentences recognized by the NLU system can then be fed into the NLG system to train the NLG system on how to produce language output for a given concept that stylistically resembles the concept-tagged input sentence.

Through these and other features, example embodiments of the invention provide significant technical advances in the NLU arts by harnessing computer technology to improve how the expression of concepts within sentences are recognized via machine processing.

BRIEF DESCRIPTION OF THE DRAWINGS

FIGS. 6A and 6B show an example of a dependency parse tree for a sentence.

FIG. 10A shows an example GUI for manually classifying an unclassified sentence with a concept classification.

FIG. 10B shows an example process flow in relation to FIG. 10A.

DETAILED DESCRIPTION OF EXAMPLE EMBODIMENTS

Figure 1:
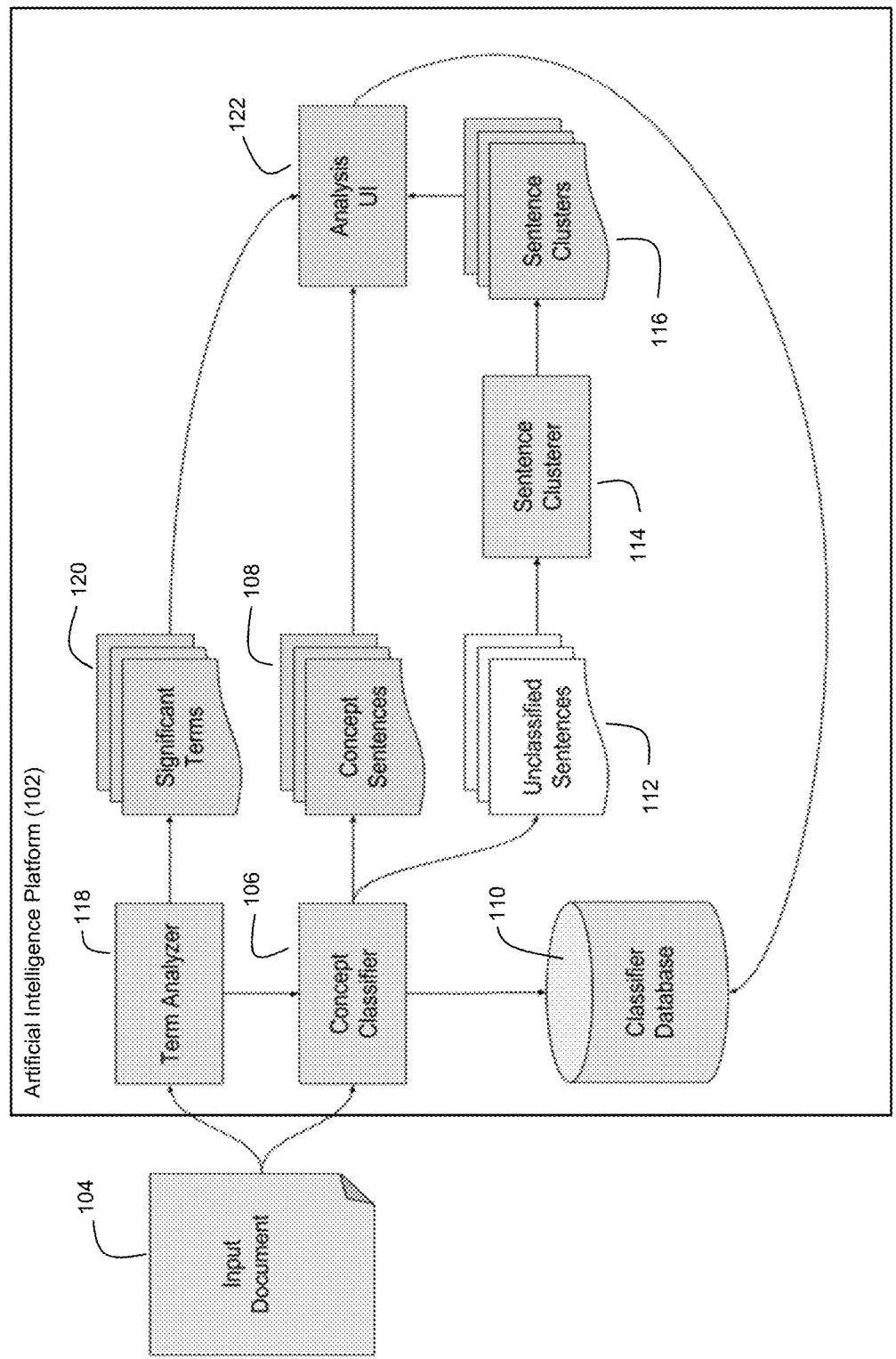
FIG. 1 discloses an example AI computer system in accordance with an example embodiment.

FIG. 1 shows an artificial intelligence (AI) platform 102 in accordance with an example embodiment. The AI platform 102 may take the form of a computer system that comprises one or more processors and associated memories that cooperate together to implement the operations discussed herein. The AI platform 102 may also include a data source that serves as a repository of data for analysis by the AI platform 102 when processing inputs and generating outputs. These components can interconnect with each other in any of a variety of manners (e.g., via a bus, via a network, etc.). For example, the AI platform 102 can take the form of a distributed computing architecture where one or more processors implement the NLU tasks described herein. Furthermore, different processors can be used for different tasks, or alternatively some or all of these processors may implement all of the tasks. It should also be understood that the AI platform 102 may include additional or different components if desired by a practitioner. The one or more processors may comprise general-purpose processors (e.g., a single-core or multi-core microprocessor), special-purpose processors (e.g., an application-specific integrated circuit or digital-signal processor), programmable-logic devices (e.g., a field programmable gate array), etc. or any combination thereof that are suitable for carrying out the operations described herein. The associated memories may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory may also be integrated in whole or in part with other components of the AI platform 102. Further, the memory may be local to the processor(s), although it should be understood that the memory (or portions of the memory) could be remote from the processor(s), in which case the processor(s) may access such remote memory through a network interface. The memory may store software programs or instructions that are executed by the processor(s) during operation of the AI platform 102. Such software programs can take the form of a plurality of instructions configured for execution by processor(s). The memory may also store project or session data generated and used by the AI platform 102. The data source can be any source of data, such as one or more databases, file systems, computer networks, etc. which may be part of the memory accessed by the processor(s).

The AI platform 102 analyzes unstructured text and identifies new forms of expressions for known NLG concepts and ontological entity types. The AI platform 102 can also discover entirely new concepts and entity types. The AI platform 102 presents its findings to users via a UI 122 that allows users to refine the system's discovery mechanism, as well as expedite the addition of new ontological entity types to an underlying NLG platform.

The AI platform 102 can interoperate with an NLG computer system as discussed above and below to improve the operation of the NLG computer system. An example of NLG technology that can be used as the NLG system 108 is the QUILL™ narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,178, 9,697,197, 9,697,492, 9,720,884, 9,720,899, 9,977,773, 9,990,337, and 10,185,477; and U.S. patent application Ser. No. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), Ser. No. 15/666,151 (entitled "Applied Artificial Intelligence Technology for Interactively Using Narrative Analytics to Focus and Control Visualizations of Data", filed Aug. 1, 2017), Ser. No. 15/666,168 (entitled "Applied Artificial Intelligence Technology for Evaluating Drivers of Data Presented in Visualizations", filed Aug. 1, 2017), Ser. No. 15/666,192 (entitled "Applied Artificial Intelligence Technology for Selective Control over Narrative Generation from Visualizations of Data", filed Aug. 1, 2017), 62/458,460 (entitled "Interactive and Conversational Data Exploration", filed Feb. 13, 2017), Ser. No. 15/895,800 (entitled "Interactive and Conversational Data Exploration", filed Feb. 13, 2018), 62/460,349 (entitled "Applied Artificial Intelligence Technology for Performing Natural Language Generation (NLG) Using Composable Communication Goals and Ontologies to Generate Narrative Stories", filed Feb. 17, 2017), Ser. No. 15/897,331 (entitled "Applied Artificial Intelligence Technology for Performing Natural Language Generation (NLG) Using Composable Communication Goals and Ontologies to Generate Narrative Stories", filed Feb. 15, 2018), Ser. No. 15/897,350 (entitled "Applied Artificial Intelligence Technology for Determining and Mapping Data Requirements for Narrative Stories to Support Natural Language Generation (NLG) Using Composable Communication Goals", filed Feb. 15, 2018, now U.S. Pat. No. 10,585,983), Ser. No. 15/897,359 (entitled "Applied Artificial Intelligence Technology for Story Outline Formation Using Composable Communication Goals to Support Natural Language Generation (NLG)", filed Feb. 15, 2018), Ser. No. 15/897,364 (entitled "Applied Artificial Intelligence Technology for Runtime Computation of Story Outlines to Support Natural Language Generation (NLG)", filed Feb. 15, 2018), Ser. No. 15/897,373 (entitled "Applied Artificial Intelligence Technology for Ontology Building to Support Natural Language Generation (NLG) Using Composable Communication Goals", filed Feb. 15, 2018), Ser. No. 15/897,381 (entitled "Applied Artificial Intelligence Technology for Interactive Story Editing to Support Natural Language Generation (NLG)", filed Feb. 15, 2018), 62/539,832 (entitled "Applied Artificial Intelligence Technology for Narrative Generation Based on Analysis Communication Goals", filed Aug. 1, 2017), Ser. No. 16/047,800 (entitled "Applied Artificial Intelligence Technology for Narrative Generation Based on Analysis Communication Goals", filed Jul. 27, 2018), Ser. No. 16/047,837 (entitled "Applied Artificial Intelligence Technology for Narrative Generation Based on a Conditional Outcome Framework", filed Jul. 27, 2018), 62/585,809 (entitled "Applied Artificial Intelligence Technology for Narrative Generation Based on Smart Attributes and Explanation Communication Goals", filed Nov. 14, 2017), Ser. No. 16/183,230 (entitled "Applied Artificial Intelligence Technology for Narrative Generation Based on Smart Attributes", filed Nov. 7, 2018), Ser. No. 16/183,270 (entitled "Applied Artificial Intelligence Technology for Narrative Generation Based on Explanation Communication Goals", filed Nov. 7, 2018), 62/618,249 (entitled "Applied Artificial Intelligence Technology for Narrative Generation Using an Invocable Analysis Service", filed Jan. 17, 2018), Ser. No. 16/235,594 (entitled "Applied Artificial Intelligence Technology for Narrative Generation Using an Invocable Analysis Service", filed Dec. 28, 2018), Ser. No. 16/235,636 (entitled "Applied Artificial Intelligence Technology for Narrative Generation Using an Invocable Analysis Service with Analysis Libraries", filed Dec. 28, 2018), Ser. No. 16/235,662 (entitled "Applied Artificial Intelligence Technology for Narrative Generation Using an Invocable Analysis Service and Data Re-Organization", filed Dec. 28, 2018), Ser. No. 16/235,705 (entitled "Applied Artificial Intelligence Technology for Narrative Generation Using an Invocable Analysis Service and Configuration-Driven Analytics", filed Dec. 28, 2018), 62/632,017 (entitled "Applied Artificial Intelligence Technology for Conversational Inferencing and Interactive Natural Language Generation", filed Feb. 19, 2018), Ser. No. 16/277,000 (entitled "Applied Artificial Intelligence Technology for Conversational Inferencing", filed Feb. 15, 2019), Ser. No. 16/277,003 (entitled "Applied Artificial Intelligence Technology for Conversational Inferencing and Interactive Natural Language Generation", filed Feb. 15, 2019), Ser. No. 16/277,004 (entitled "Applied Artificial Intelligence Technology for Contextualizing Words to a Knowledge Base Using Natural Language Processing", filed Feb. 15, 2019), Ser. No. 16/277,006 (entitled "Applied Artificial Intelligence Technology for Conversational Inferencing Using Named Entity Reduction", filed Feb. 15, 2019), Ser. No. 16/277,008 (entitled "Applied Artificial Intelligence Technology for Building a Knowledge Base Using Natural Language Processing", filed Feb. 15, 2019), 62/691,197 (entitled "Applied Artificial Intelligence for Using Natural Language Processing to Train a Natural Language Generation System", filed Jun. 28, 2018), Ser. No. 16/444,649 (entitled "Applied Artificial Intelligence Technology for Using Natural Language Processing and Concept Expression Templates to Train a Natural Language Generation System", filed Jun. 18, 2019, now U.S. Pat. No. 10,706,236), Ser. No. 16/444,689 (entitled "Applied Artificial Intelligence Technology for Using Natural Language Processing to Train a Natural Language Generation System With Respect to Numeric Style Features", filed Jun. 18, 2019), Ser. No. 16/444,718 (entitled "Applied Artificial Intelligence Technology for Using Natural Language Processing to Train a Natural Language Generation System With Respect to Date and Number Textual Features", filed Jun. 18, 2019), and Ser. No. 16/444,748 (entitled "Applied Artificial Intelligence Technology for Using Natural Language Processing to Train a Natural Language Generation System", filed Jun. 18, 2019); the entire disclosures of each of which are incorporated herein by reference.

In an example embodiment, the AI platform 102 takes a text document 104 as input. The document 104 may comprise one or more sentences in a natural language. The AI platform 102 can perform any of the following forms of analysis via a concept classifier 106, a sentence clusterer 114, and/or a term analyzer 118:

Concept classification. Classifier 106 is trained on a corpus of concept-tagged sentences to identify sentences that express known NLG concepts (concept sentences 108). Classifier database 110 can store a training corpus and corresponding classification structure that is used by the classifier 106 to support operations.

Sentence clustering. Sentence clusterer 114 performs clustering analysis on unclassified sentences 112 to group similar sentences into potentially meaningful buckets (sentence clusters 116). These clusters 116 can then be reviewed through the UI 122 as discussed below.

Term analysis. Term analyzer 118 analyzes the terms present in the document 104 to determine which are terms are distinguishable from the terms found in the training corpus (see significant terms 120). These significant terms 120 can then be reviewed through the UI 122 as discussed below.

Through the UI(s) 122 that present the results of this analysis, users can do the following:

Change, remove, or create a concept associated with a classified sentence, which subsequently retrains the classifier and improves precision on future use;

Attach or create a new concept associated with a sentence cluster, which subsequently retrains the classifier and improves classification precision on future use; and/or Add a new entity type to the underlying NLG platform's ontology.

Figure 2A:
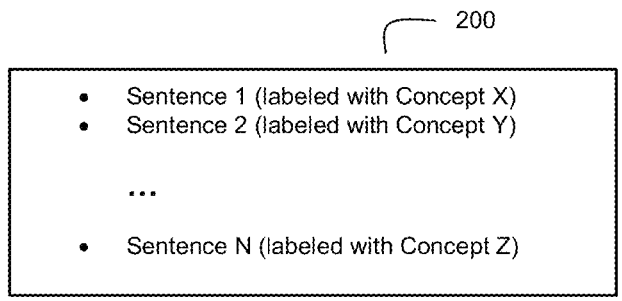
FIG. 2A shows an example training corpus of concept-labeled sentences for training a concept classifier in accordance with an example embodiment.
Figure 2B:
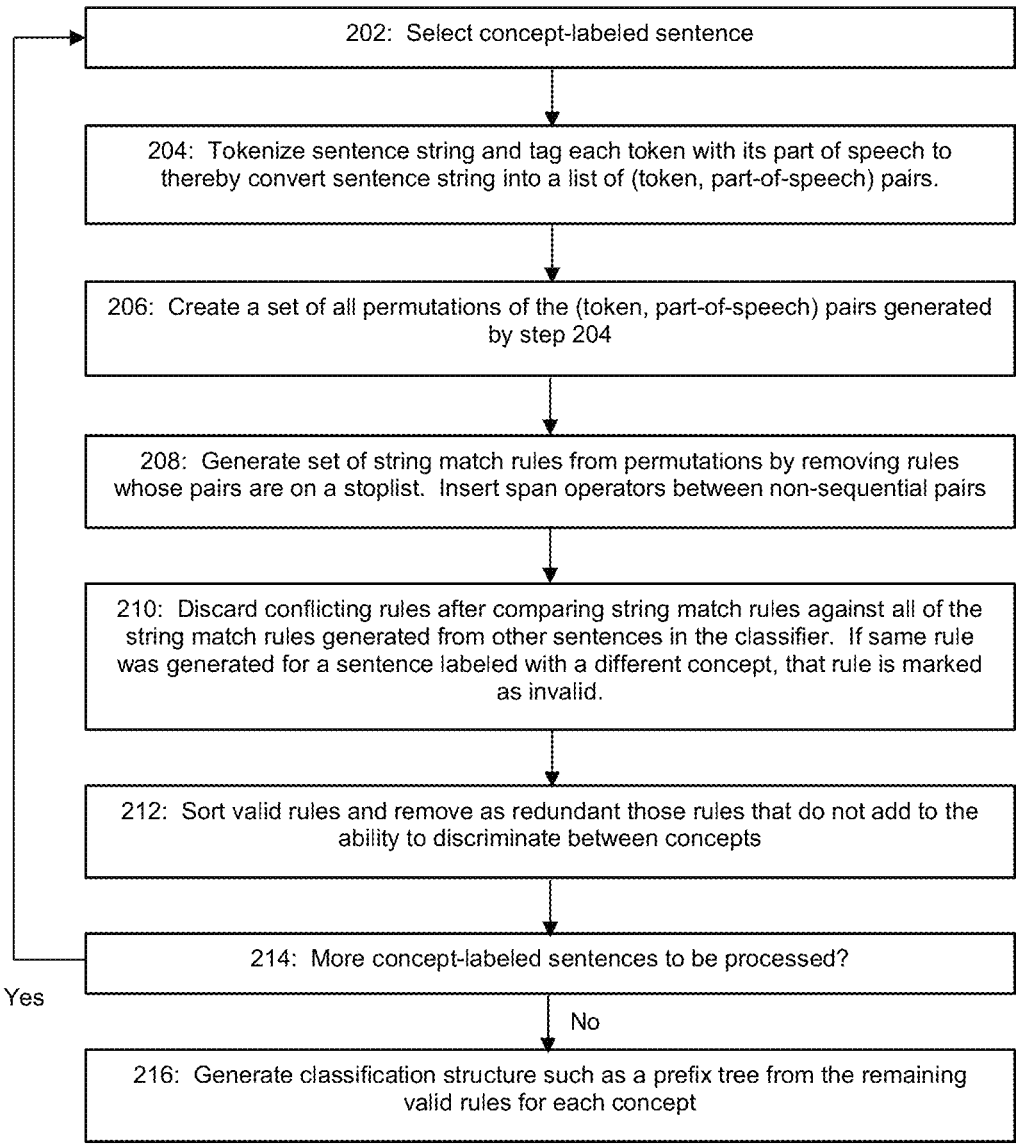
FIG. 2B shows an example process flow for training a concept classifier.

A. Concept Classification:

The AI platform 102 can be adaptive via a training mechanism through which the classifier 106 learns how to recognize sentences that express known concepts. As used herein, "concept" can refer to a higher level meaning that is expressed by a sentence beyond the literal meaning of the words in the sentence. For example, a given sentence can include the literal words: "In 2018, the sales team improved their sales 10% over their benchmark." This sentence can be characterized as expressing the concept of "Deviation from Target" because this concept encapsulates a higher level meaning expressed by the sentence. A concept can be explicitly represented in the AI system by a combination of (1) analytics and logic for recognizing the concept, and (2) language that is used to express the concept. For example, the "Deviation from Target" concept can be explicitly represented by analytics that determine how a metric is tracking to a goal (or determine how the spread from the metric to its goal changes over time). The "Deviation from Target" concept can also be explicitly represented by logic that determines what in a data set is most relevant to express when describing how the metric deviates from the target. For instance, if a salesperson was above his or her goal for 90% of the time, it may be desirable for the NLG system to product a sentence that describes, on average, how much higher than the target the salesperson was. Then the "Deviation from Target" can be explicitly represented by language that expresses that content. Additional examples of concepts that can expressed by sentences and recognized by the AI platform 102 can include, without limitation, (1) average value, (2) average over time frame", (3) count contributors, (4) deviation drivers, (5) deviation from others, (6) deviation from self, (6) latest value, (7) maximum within time frame, (8) minimum within time frame, (9) outlier assessment, (10) project against target, (11) runs comparison, and/or (12) total across time frame. To support this training, a training corpus of concept-labeled sentences can be processed as described in FIG. 2B. FIG. 2A shows an example training corpus 200, where the training corpus comprises a plurality of concept-labeled natural language sentences of unstructured text, and where each sentence is associated with an explicit representation of a concept that is expressed by that sentence. The training corpus 200 will thus define a number of different concepts and a number of different sentences that are linked to such concepts. FIG. 2B defines an example process flow that uses sentence structure to derive a set of string match rules that support the classification process. Once the classifier 106 has been trained in accordance with FIG. 2B, it can take in an arbitrary text string as a new sentence (e.g., input document 104) and return the name of a concept to which that new sentence maps (if the classifier 106 finds a match).

In an example embodiment, the classifier 106 operates using string match rules. These rules define matching operations that are targeted toward particular strings of text, and they can operate in a manner similar to regular expressions but with more restricted semantics. In example embodiments, the string match rules describe co-occurrence, adjacency, and order within a text string. String match rules may be comprised of the following types of token components:

A (token, part-of-speech) pair. An example would be [increase, VERB], which targets the root word "increase" when used in a string as a verb. Another example would be [person, NOUN], which targets the root word "person" when used in a string as a noun.

A numeric value, {NUM}. This string match rule would denote a numeric value in a string (e.g., 5, 50.32, $50.32, 50.32%, etc.).

A known ontological entity type, {ENT}. If the AI platform 102 includes an NLG system that has access to an ontology, such as the ontology described in the above-referenced and incorporated patents and patent applications (see, for example, the above-referenced and incorporated U.S. patent application Ser. Nos. 16/183, 230, 16/183,270, and 15/897,350 (now U.S. Pat. No. 10,585,983)), this ontology can describe a pre-existing knowledge-base for the AI platform 102. Any words in a text string that match an entity type in the ontology can be denoted by {ENT}.

A wild card or span operator/token, { ... }, which denotes a sequence of one or more tokens of any type.

As an example, we can consider the following 3 string match rules:

1. [contribute, VERB]
2. [contribute, VERB] { ... } [decline, NOUN]
3. [contribute, VERB] { ... } [decline, NOUN] { ... } {NUM}

The following sentence will be matched by only the first rule above: "Higher costs contributed to the decrease in profit." This sentence includes the root word "contribute" as a verb; but it does not includes the noun "decline" (or have a number), which causes the second and third rules to fail.

The following sentence will be matched by only the first two rules above: "Higher costs contributed to a decline in profit." This sentence includes the root word "contribute" as a verb (causing a hit on Rule 1), and it also includes both the root word "contribute" as a verb and the root word "decline" as a noun (causing a hit on Rule 2); but it does not include a number, which causes the third rule to fail.

The following sentence will be matched by all three of the rules above: "Higher costs contributed to a decline in profit by 50%.". With this sentence, the inclusion of the numeric value (50%) also caused the third rule to be a hit in addition to the first two rules.

A.1: Rule Induction:

As noted above, FIG. 2B describes an example learning process through which the classifier 106 automatically generates a set of rules that map sentences to known concepts. At step 202, the classifier 106 selects a concept-labeled sentence from the training corpus 200. This sentence will be a string of words arranged as natural language text.

Step 204

At step 204, the classifier tokenizes the selected sentence string and tags each token in the sentence with its part-ofspeech pair to thereby convert the sentence string into a list of components, including (token, part-of-speech) pairs. This step tags each token with its part-of-speech. This step also converts all numeric values to {NUM} tokens and converts all expressions of ontological entity types to {ENT} tokens. To perform step 204, the classifier 204 can use an NLP library technology such as the Explosion AI's Spacy tool.

Figure 3A:
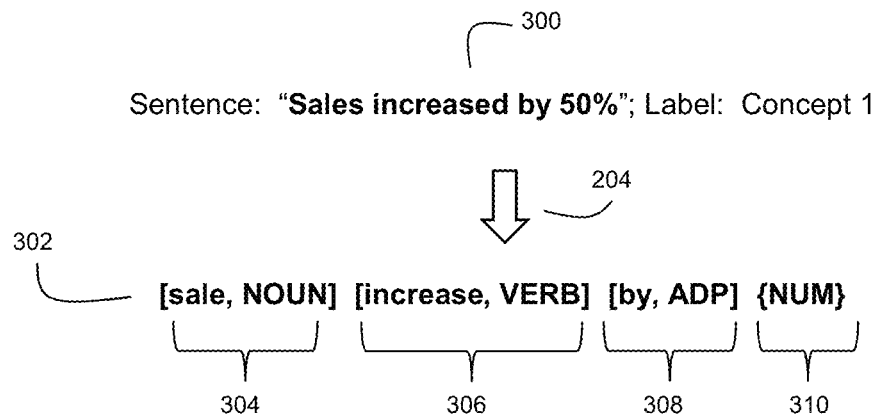
FIGS. 3A-3H show examples of inputs and outputs and process flows with respect to various steps of FIG. 2B.

As an example, with reference to FIG. 3A, we can consider the sentence 300: "Sales increased by 50%.", which is labeled in the training corpus with "Concept 1". Step 204 would convert this sentence into the token string 302 of: [sale, NOUN] [increase, VERB] [by, ADP] {NUM}, as shown by FIG. 3A. Token 304 denotes the root word and part-of-speech for "Sales". Token 306 denotes the root word and part-of-speech for "increased". Token 308 denotes the root word and part-of-speech for "by". Token 310 denotes that "50%" is a numeric value.

Step 206

Figure 3B:
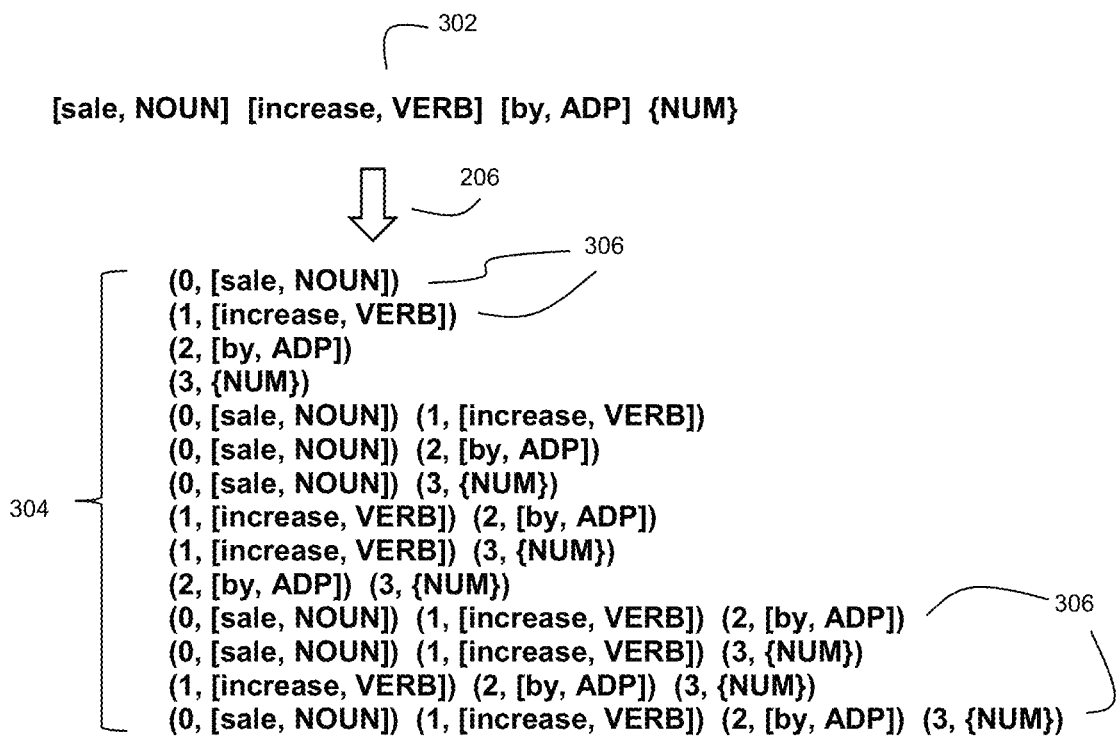

Next, at step 206, the classifier 106 creates a set of all permutations of the token components of the token string generated by step 204. As part of this operation, an index integer can be associated with each token to maintain a record of order, which can later be used to determine adjacency. FIG. 3B shows an example where token string 302 is processed to generate the permutations set 304. As can be seen, token 304 from FIG. 3A has been indexed by the value "0" to show that it was the first token in token string 302. Similarly, token 306 has been indexed by the value "1" and so on through token 310 (which has been indexed with the value "3"). As can be seen from FIG. 3B, the permutation set 304 includes 14 different rules 306 that correspond to different permutations of the token components of token string 302. As can be seen, the various rules 306 of the different permutations maintain the ascending indexing order applied to the token components.

Step 208

At step 208, the classifier 106 generates a set of string match rules from the permutation set. As part of this step, the different permutations of the permutation set are compared to a stoplist that seeks to remove rules that target non-salient components of a sentence. For example, the stoplist can be like the Natural Language Toolkit (NLTK) stoplist that filters out words such as "a", "the", etc., or isolated prepositions or prepositional phrases that are not anchored to a reference. The stoplist can also filter out rules that are comprised solely of a numeric token. Further still, at step 208, for any rules whose token components are non-sequential based on their indexing values, the classifier 106 can insert the span operator token, { . . . }.

Figure 3C:
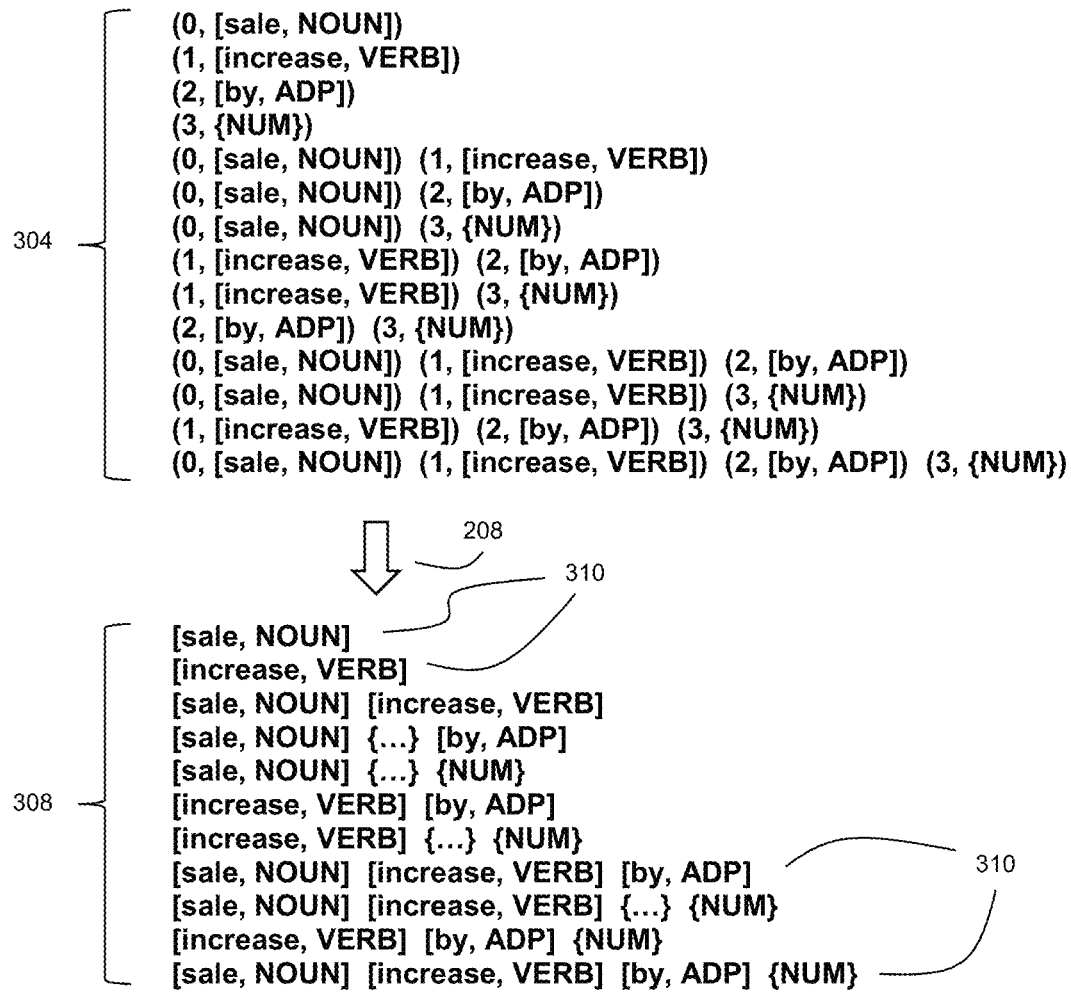

FIG. 3C shows an example operation of step 208 on the permutation set 304. Step 208 produces a rule set 308, where span operator tokens { . . . } have been inserted between non-sequential token components of the individual rules 310. Furthermore, it can be seen that various rules 306 from permutation set 304 have been filtered out of rule set 308 by step 308. For example, the [by, ADP] rule 306, the {NUM} rule 306, and the ([by, ADP] {NUM}) rule 306 have been removed from rule set 308.

Step 210

At step 210, the classifier 106 discards conflicting rules after comparing the string match rules of the rule set produced by step 206 against all of the string match rules generated from other sentences in the classifier 106. If the same rule was generated for a sentence labeled with a different concept, then that rule is marked as invalid because it will not be helpful when distinguishing among concepts. Once marked as invalid, future occurrences of that invalid rule can also be discarded. To support step 210, the classifier 106 can interact with classifier database 110 to access the rules generated from other sentences and their associated concept labels. If step 210 results in all of the rules of the rule set for the subject sentence being discarded, this would result in the subject sentence being deemed unclassifiable, and the process flow could then jump to step 214.

Figure 3D:
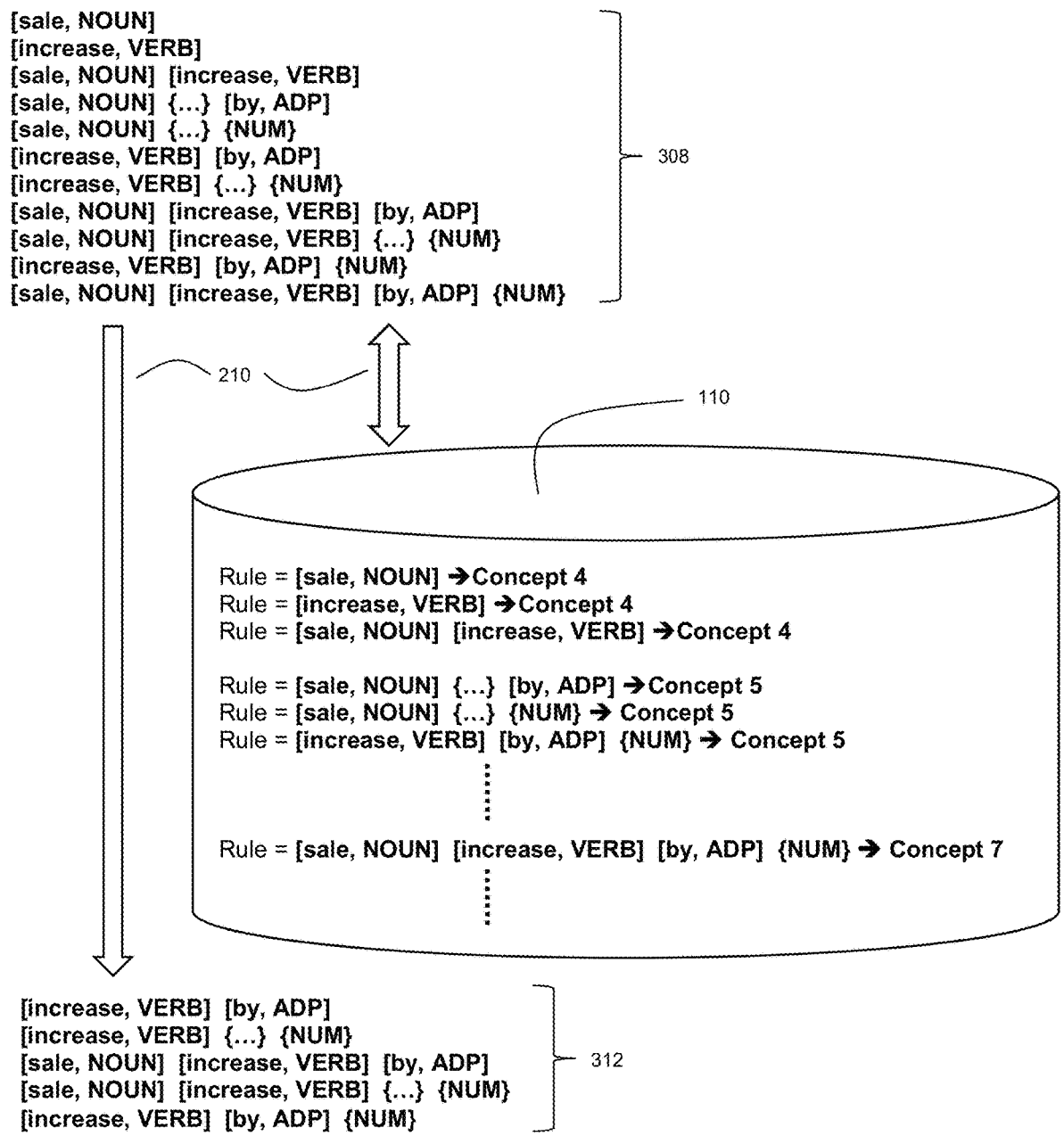

FIG. 3D shows an example operation of step 210 starting from the rule set 308. It will be recalled that rule set 308 is linked to "Concept 1". Step 210 will compare each of the rules 310 within set 308 with rules in database 110 to see if any of the rules 310 match a database rule for a different concept. If so, that rule is removed from the valid rule set 312. In the example of FIG. 3D, it can be seen that rule set 308 (with 11 rules) has been filtered down to a valid rule set 312 of 5 rules. After the performance of step 210, the remaining set of rules within rule set 312 are guaranteed to only match sentences of the subject concept within the semantics of the system.

Step 212

At step 212, the classifier 106 sorts the valid rules according to defined sorting criteria and then removes the valid rules that are redundant in that they do not add to the classifier's ability to distinguish between concepts. For example, if the valid rule set from step 210 includes 2 rules linked to Concept X, and both of those rules operate to produce matches on the same set of sentences (there are no sentences linked to Concept X that match on Rule 1 but nor Rule 2 and vice versa), then the system can remove one of the rules as being redundant.

Figure 3E:
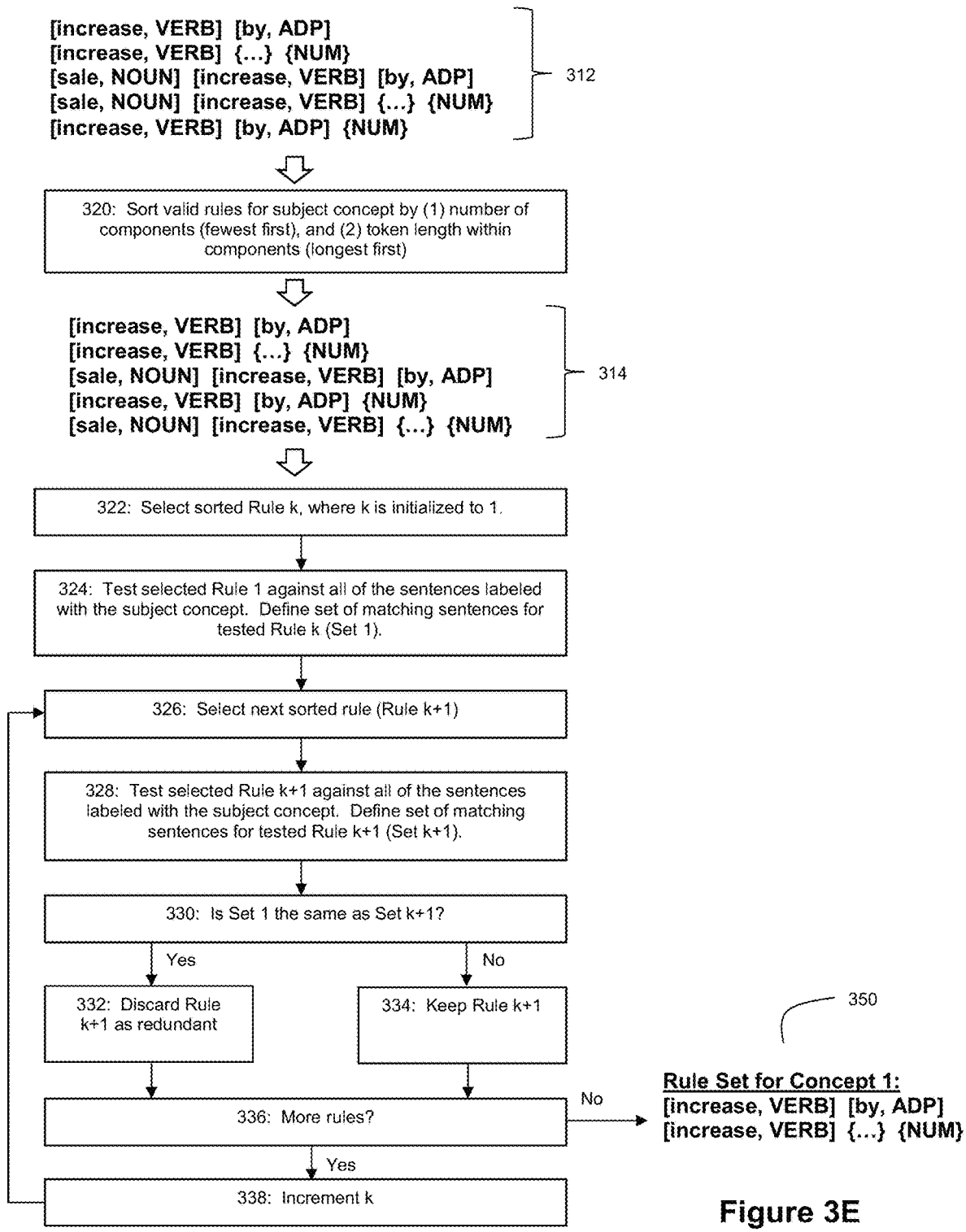

FIG. 3E shows an example implementation of step 212, working from valid rule set 312. At step 320, the classifier sorts the valid rules for the subject concept by defined criteria such as a primary sort by the number of rule components (fewest first) and a secondary sort by token length within components (longest first). For this secondary sort, in an example embodiment, the classifier can use the longest token in the rule as metric for token length with respect to that rule. In an example embodiment, a span operator token could be treated a single token for purposes of the primary sort and treated as having a defined token length (such as a length of 1) for the secondary sort. However, it should be understood that other techniques for quantifying token length with respect to a rule could be used (for example, the classifier could compute an average token length for the tokens within a rule). The primary and secondary sort rules for step 320 are based on a hypothesis that fewer rule components will match a wider range of expressions (e.g., "increase" will match more strings than "an increase of"), while longer terms are less likely to be ambiguous (e.g., "increase" is likely less ambiguous than "grow", even though both words could be used to express change).

This sorting step 320 can produce a sorted rule set 314 as shown by FIG. 3D. In this sorted rule set 314, it can be seen that the rule ([increase, VERB] [by, ADP] {NUM} has moved up a spot as a result of the sorting.

The process flow of FIG. 3E then seeks to identify and remove redundant rules. At step 322, sorted Rule k is selected (where k can be initialized as k=1). At step 324, the classifier tests selected Rule 1 against all of the sentences in the training corpus 200 that are labeled with the subject concept. This testing produces a set of sentences that match against Rule 1, which can defined as Set 1.

At step 326, the classifier selects the next sorted rule (Rule k+1), which in this example can be sorted Rule 2. At step 328, the classifier tests selected Rule 2 against all of the sentences in the training corpus 200 that are labeled with the subject concept. This testing produces a set of sentences that match against Rule 2, which can defined as Set 2.

At step 330, the classifier compares Set 1 with Set 2. If these two sets have the same composition of sentences, this means that Rule 2 is redundant to Rule 1, and Rule 2 can be discarded (step 332). However, it should be understood that a practitioner could also design the classifier to instead discard Rule 1 in this situation. However, if the two sets do not have the same compositions of sentences, this means that Rule 2 is not redundant to Rule 1, in which case Rule 2 can be retained as part of the rule set for the subject concept (step 334).

At step 336, the classifier checks for whether there are more rules in the sorted rule set 314 to be assessed for redundancy. If there are, the classifier can increment k (step 338) to go to the next rule (e.g., Rule 3) and return to step 326. In this fashion, Rule 3 can also be tested for redundancy against Rule 1 (and so on for the other rules of the sorted rule set 312). Once all rules have been redundancy tested, the classifier produces rule set 305 for the subject concept, where rule set 350 is an optimal rule set for testing sentences to determine whether they express the subject concept. In this example, optimal rule set 350 includes two rules as shown by FIG. 3E. This rule set 350 can be stored in the classifier database 110 in association with the subject concept.

It should be understood that the FIG. 3E process flow can include levels of iteration for re-testing rules that are kept at step 334 for redundancy. For example, it may be the case that Rules 2 and 3 are not redundant to Rule 1, but Rule 3 may be redundant to Rule 2. The process flow of FIG. 3E (steps 322-338) can be iteratively repeated for all rules that are kept at step 334 until redundancy is fully tested across all of the valid rules to thereby arrive at the optimal rule set 350.

Step 214

At step 214, the classifier checks whether there are more concept-labeled sentences in the training corpus 200 to be processed. If so, the process flow returns to step 202 so that a rule set can be induced from the next sentence in the training corpus 200. Once all of the sentences in the training corpus 200 have been processed through steps 202-212, the classifier will have rule sets for each of the concepts recognized within the training corpus, and the process flow can proceed to step 216.

Step 216

At step 216, the classifier generates a classification structure based on the valid rules for each of the concepts that were used to label the training sentences. This classification structure can then be used to process new sentences and determine whether any of the new sentences are fits with any of the recognized concepts. The classification structure can take the form of a prefix tree data structure that are loaded with the optimal rule sets produced by step 212 for the different recognized concepts.

Figure 3F:
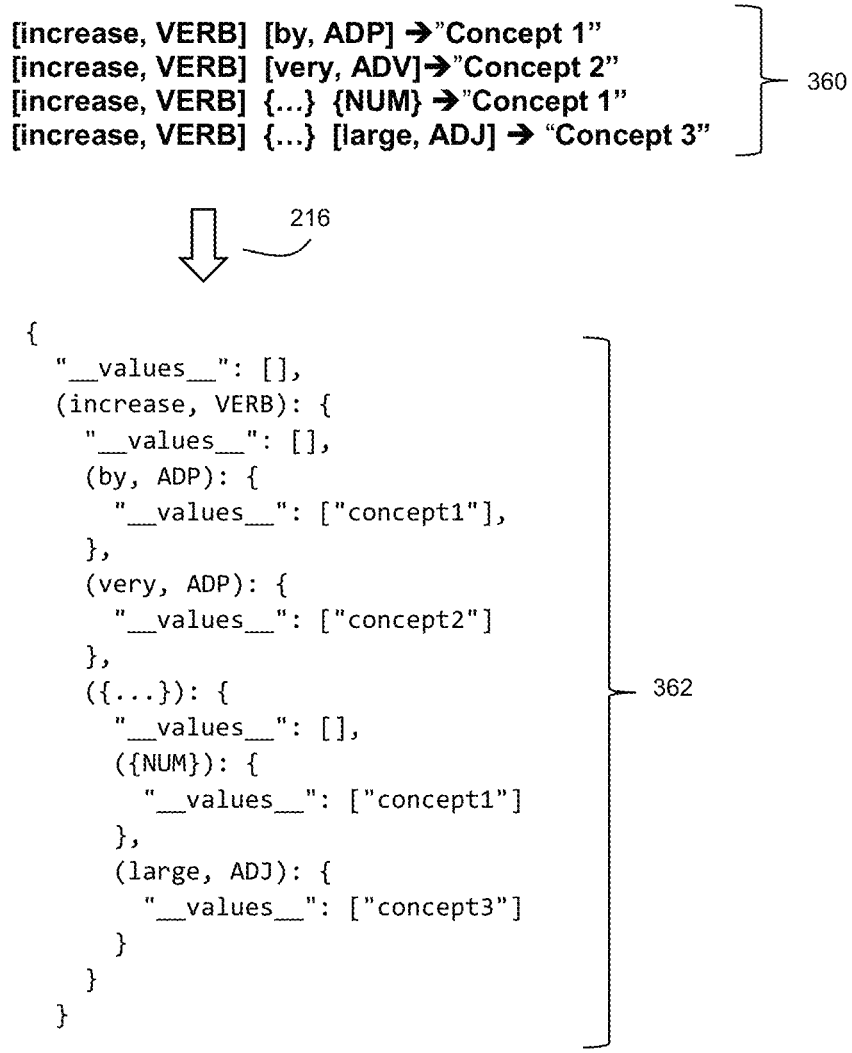
Figure 3G:
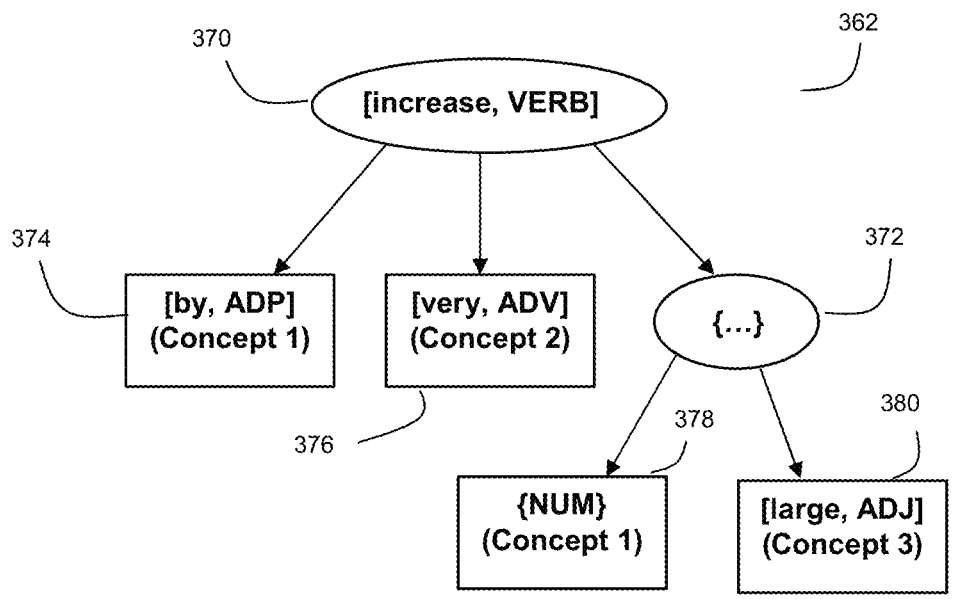

FIG. 3F shows an example prefix tree data structure 262 that is built from optimal rule sets 360. In this simplified example, it can be seen that two rules are linked to "Concept 1", one rule is linked to "Concept 2", and one rule is linked to "Concept 3". Prefix tree data structure 362 defines a tree index that tests the tokenized version of a given sentence to determine whether any of the 4 rules of set 360 are satisfied. The prefix tree data structure 362 then returns the concept that is linked to the matching rule. FIG. 3G shows another visual representation of the prefix tree data structure 362 of FIG. 3F. In the FIG. 3F version, root node 370 tests the tokenized sentence for the presence of the verb "increase". If a match is found, then subsequent tokens in the sentence are tested via nodes 372, 374, and 376. Node 372 is a branch node that tests for the span operator token following the verb "increase". If node 372 hits on the sentence, then the tree progresses to nodes 378 and 380. Leaf node 374 tests for the preposition "by" immediately following the verb "increase". It should be understood that if the test were defined to include the span operator between the words "by" and "increase", then the node would hit on a sentence where zero or more words followed "by" and preceded "increase". Leaf node 374 is paired with Concept 1; thus if leaf node 374 hits on the sentence, then that sentence is classified with Concept 1. Leaf node 376 tests for the adverb "very" immediately following the verb "increase". Leaf node 376 is paired with Concept 2; thus if leaf node 376 hits on the sentence, then that sentence is classified with Concept 2. Leaf node 378 tests for a number following the verb "increase". Leaf node 378 is paired with Concept 1; thus if leaf node 378 hits on the sentence, then that sentence is classified with Concept 1. Leaf node 380 tests for the adjective "large" following the verb "increase". Leaf node 380 is paired with Concept 3; thus if leaf node 380 hits on the sentence, then that sentence is classified with Concept 3.

Accordingly, it should be understood that the FIG. 2B process flow can produce a classification structure that is configured to classify sentences as to whether they express any of a number of concepts based on their sentence structure and composition.

Figure 3H:
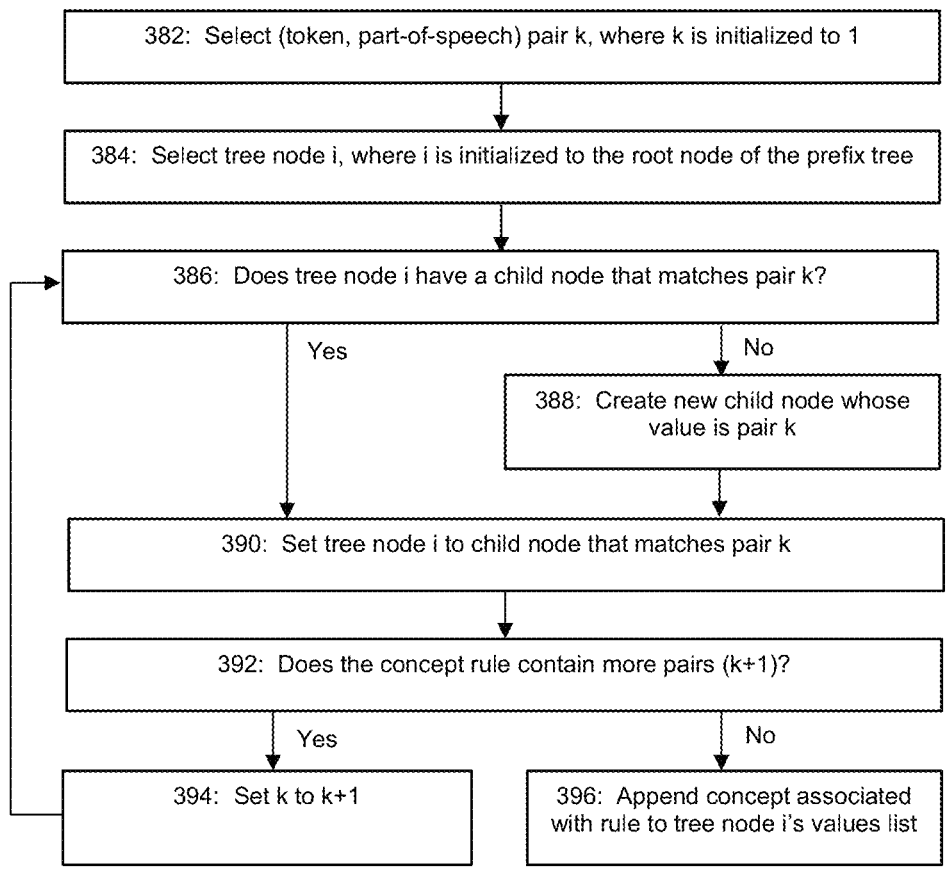

FIG. 3H shows an example process flow for step 216 to create the prefix tree structure from the valid rules for the concept(s). It should be understood that the FIG. 3H process flow could be repeated for each of the concepts for which there are rule sets such that the resultant prefix tree is able to test for any of the subject concepts defined by the rules. At step 382, the classifier selects a (token, part-of-speech) pair k from the concept's rule set, where k is initialized to 1. At step 384, the classifier selects a tree node i for the prefix tree structure, where i is initialized to the root node of the prefix tree. At step 386, the classifier checks whether tree node i has a child node that matches the selected pair k. If not, then the classifier creates a new child node in the prefix tree under the selected node, where the new child node's value is the selected pair k. If yes at step 386, this means that the prefix tree already has a node that tests for the selected pair k and the process flow can proceed to step 390. At step 390, the classifier progresses to the next tree node by setting the selected tree node i to the child node that matches pair k. At step 392, the classifier checks whether there are more pairs for the subject concept rule. If so, the classifier increments k at step 394 and returns to step 386. If no, the classifier appends the subject concept associated with the rule to the selected tree node i's value list to thereby tag that node as corresponding to a hit on the subject concept. As the process flow of FIG. 3H iterates through the rules for the various concepts, the classifier is able to build the prefix tree structure 262.

A.2: Custom Rules:

The classifier 106 may also support an ability to define custom, human-intuited string match rules. With a custom rule, a user can enter a specific string match rule as a sequence of tokens (as discussed above), and then pair that specific string match rule with a concept. The classifier 106 can give precedence to custom rules over the induced rules produced by the FIG. 2B process flow. Thus, sentences can be tested against the custom rules before they are tested against the classification structure produced by step 216. Custom rules allow the system to compensate for potential shortcomings in the classifier's training corpus 200, which may have a narrow or incomplete range of expression that would lead to the induction of rules that overfit the peculiarities of expressions in the corpus. Theoretically, as the training corpus 200 grows, the need for custom rules should be reduced.

Figure 4:
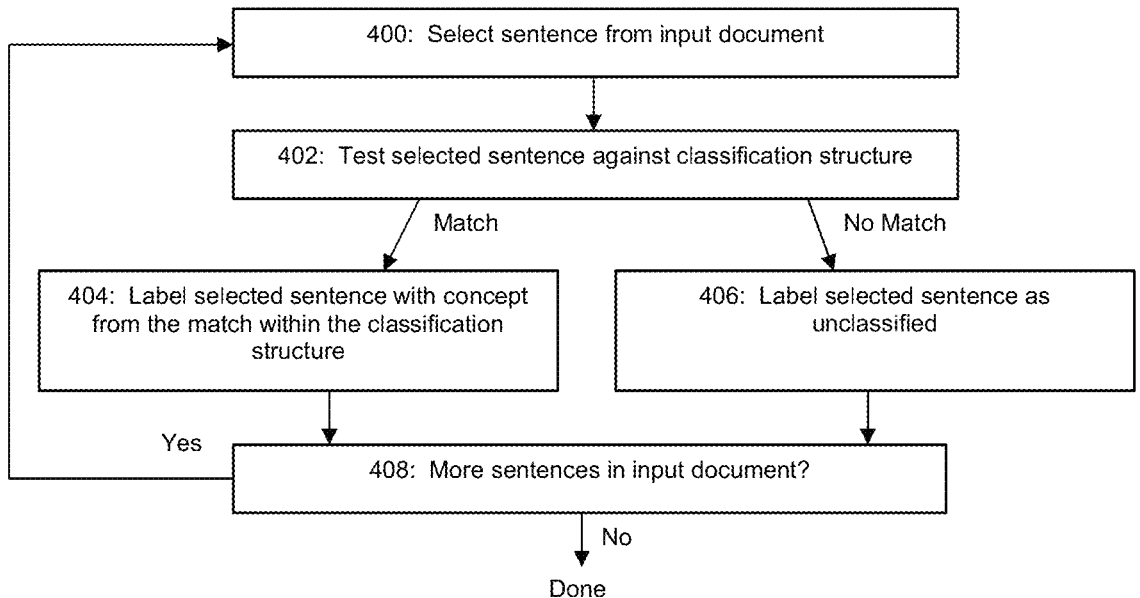
FIG. 4 shows an example process flow for concept classification by a classifier.

A.3: Classifier Operation:

The classifier 106 can then operate to classify new documents using a process flow such as that shown by FIG. 4. Classifier 106 can receive a document 104 and select a sentence from the document 104 (step 400). At step 402, the classifier tests the selected sentence against the classification structure produced by step 216. If the classifier 106 supports custom rules as noted above, it can first test the sentence against the custom rules before testing against the classification structure. As part of the testing step 402, the classifier 106 can convert the selected sentence into a tokenized representation using a process like that described above for step 204. This tokenized version of the sentence can then be compared with the string match rules encoded by the classification structure.

If step 402 finds a match, then the process flow proceeds to step 404. At step 404, the classifier 404 labels the selected sentence with the concept corresponding to the matching hit within the classification structure. Thus, the selected sentence becomes associated with a concept that the classifier deems the sentence to express.

If step 402 does not find a match, then the process flow proceeds to step 406. At step 406, the selected sentence is labeled as unclassified. This means that the sentence is not recognized as matching a known concept. As described below, unclassified sentences can be applied to a sentence clusterer 114 to further extract information from them that may be helpful to a user.

From steps 404 and 406, the process flow progresses to step 408. At step 408, the classifier checks for another sentence in the input document 104. If another sentence is present, the process flow can return to step 400. Otherwise, the process flow can terminate.

Thus, FIG. 4 describes a process flow by which the classifier 106 decides whether a sentence exhibits a structure and composition that matches a recognized concept. If so, that sentence is tagged with the subject concept. If not, the sentence is unclassified. With reference to FIG. 1, classifier 106 thus produces a pool of concept sentences 108 (sentences that have been tagged with a recognized concept) and a pool of unclassified sentences 112 (sentences that not been tagged with a recognized concept).

B. Sentence Clustering:

The AI platform 102 can also support the clustering of unclassified sentences. By grouping together unclassified sentences that are deemed similar according to defined criteria, the sentence clusterer 114 allows users to review the unclassified sentences in related clusters that allows users to make qualitative judgments as to any significance to the commonly-grouped unclassified sentences. For example, such clustering may allow the user to recognize a new concept that may be expressed by one or more of these sentence clusters. In an example embodiment, the sentence clusterer 114 uses the sentences' root verbs as the heuristic criteria for clustering. However, it should be understood that other criteria could be employed. For example, the system could use machine learning techniques to identify unclassified sentences with similar structures, and use that as the basis for sentence clustering. As another example, different words (or groups of words) in the sentence could be used for clustering, such as the subject noun.

Figure 5:
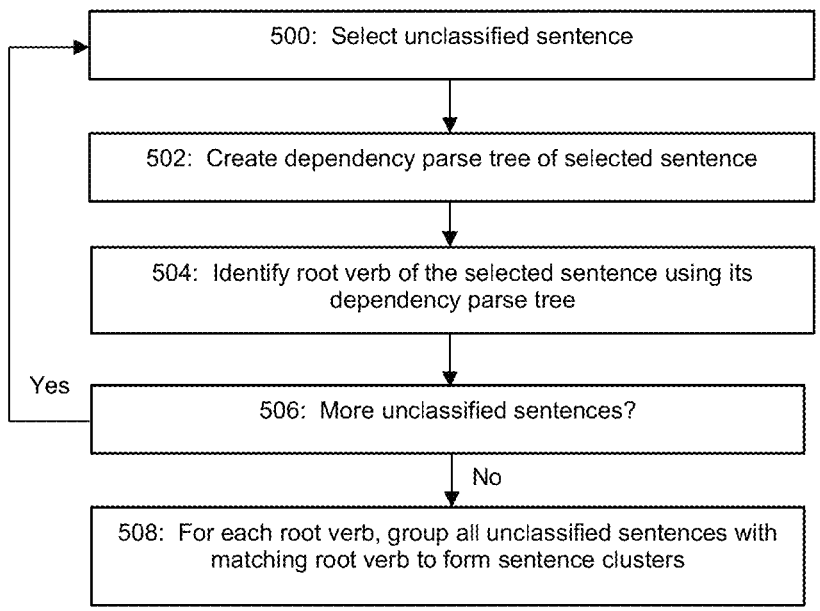
FIG. 5 shows an example process flow for sentence clustering of unclassified sentences by a sentence clusterer.

FIG. 5 shows an example process flow for sentence clustering by clusterer 114. At step 500, the clusterer 114 selects an unclassified sentence from the pool of unclassified sentences 112.

At step 502, the clusterer creates a dependency parse tree of the selected sentence. This will produce a traversable tree structure for the sentence, where the tree structure includes nodes can take the form of (token, part-of-speech) pairs. As an example, a tool such as Explosion AI's open-source Spacy tool can be used at step 502 to create the dependency parse tree. However, other tools such as Stanford's CoreNLP and Google's cloud NLP tools could be used for dependency parsing if desired by a practitioner. FIGS. 6A and 6B show an example dependency parse tree 600 created by step 502 from an example sentence: "Sales increased by 50% after manufacturing output grew to 500,000 units."

At step 504, the clusterer identifies the root verb of the selected sentence based on its dependency parse tree. To do so, the dependency parse tree can be traversed breadth-first until the first VERB node is encountered. The corresponding token for this verb can be identified as the root verb for the sentence. With respect to the example of FIGS. 6A-B, the root verb would be identified as "increased" ([increase, VERB]) as it is the shallowest verb node in the tree.

At step 506, the clusterer checks for more unclassified sentences in pool 112. If there is another unclassified sentence to be processed, the process flow returns to step 500 for a repeat of steps 502-504 on the next unclassified sentence. Once the clusterer has performed steps 502 and 504 on all of the unclustered sentences in the pool 112, the clusterer will have identified a root verb for each of those unclustered sentences, and the process flow can proceed to step 508.

At step 508, for each different root verb identified at step 504 for the various unclassified sentences, the clusterer groups the unclassified sentences that share the same root verb. This produces a set of sentence clusters 116, where each cluster 166 is linked to a particular root verb and includes all of the sentences that share that root verb. These sentence clusters can then be reviewed by a user through the UI 122 to assess whether any adjustments to the system are needed. If desired, a practitioner can set a minimum population requirement for a sentence cluster for a sentence cluster to be tagged as such in the system. Any unclassified sentences that are sorted into groups below the population count could then be discarded. For example, a minimum population requirement for a cluster 116 could be 3 sentences. However, it should be understood that if desired by a practitioner, a sentence cluster could include only a single sentence.

C. Term Discovery:

The AI platform 102 can also support the discovery of terms in the document 104 that are distinguishable from the terms found in the training corpus 200. This will allow users to audit the document's most unique terms and decide if the term can be used to express a new or existing ontological entity. Term analyzer 118 can thus process an input document 104 in combination with information learned by classifier 106 to generate a list of significant terms 120 for review through UI 122.

Figure 7:
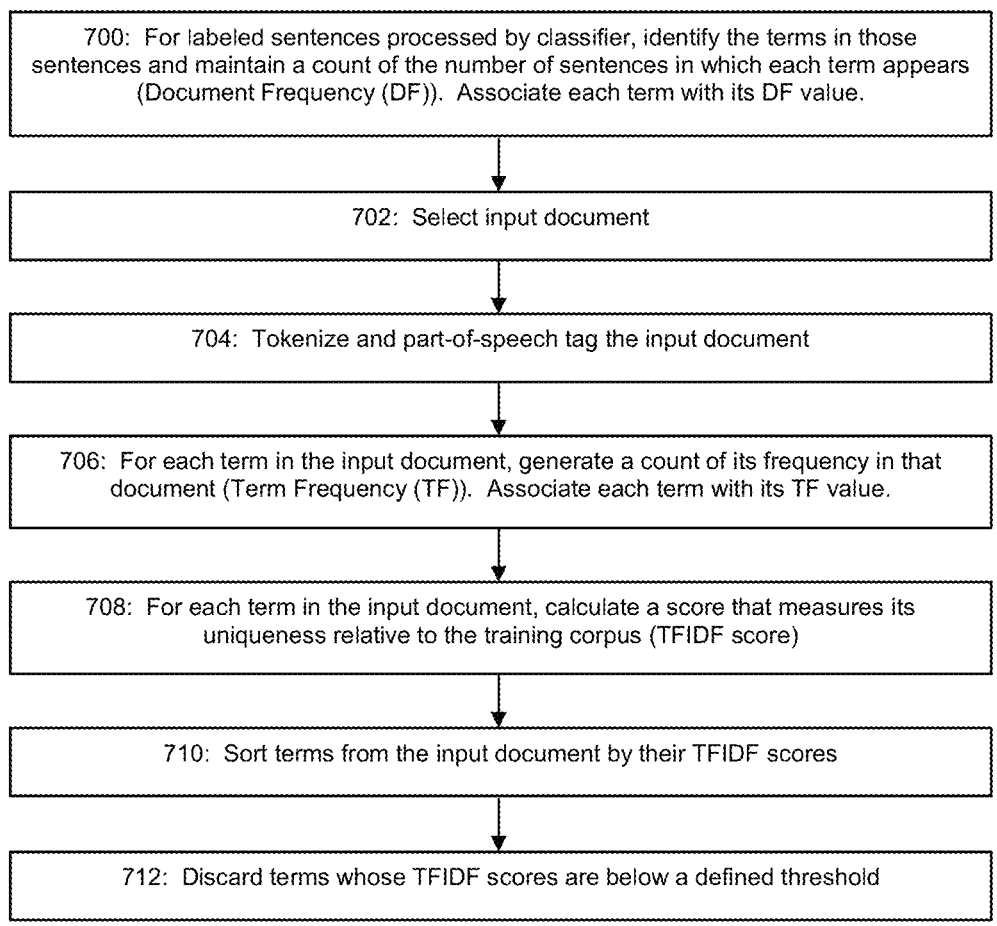
FIG. 7 shows an example process flow for term discovery by a term analyzer.

FIG. 7 shows an example process flow for term discovery by the term analyzer 118. Through this process flow, the term analyzer computes values that are measures of uniqueness relative to the training corpus for the terms of a subject document 104.

At step 700, the system operates on the training corpus 200. Step 700 can be performed by classifier 106 and/or term analyzer 118 depending on the desires of a practitioner. For the labeled sentences processed by the classifier 106, step 700 identifies the terms that appear in those training sentences. For each term, a count is maintained for the number of sentences in which each term appears. This count can be referred as a term's Document Frequency (DF). Thus, step 700 produces a DF value that is associated with each term in the training corpus 200. Step 700 can be performed as part of ingesting the document(s) 104 of the training corpus, where as part of this ingestion, the AI platform can split the document into sentences, and then for each term in the document, it can count the number of sentences that contain that term. The resulting total is then used to dynamically update the DF counts for the training corpus 200. After the DF counts are updated for a given document 104, the process flow can proceed to step 702.

At step 702, the term analyzer selects an input document 104. This document is then tokenized and part-of-speech tagged as described above in connection with steps 204 and 402.

At step 706, for each term in the input document 104, the term analyzer generates a count of that term's frequency in that document. This frequency count can be referred to as a term's Term Frequency (TF). Thus, step 706 produces a TF value that is associated with each term in document 104.

At step 708, for each term in the input document 104, the term analyzer computes a score that measures the uniqueness of that term relative to the training corpus 200, where this computation uses the term's associated DF and TF values. This uniqueness score can be referred as a TFIDF score. In an example embodiment, the TFIDF score for a given term can be computed according to the formula:

$$TFIDF = TF \times \log_{10}\left(\frac{\text{\# of Documents}}{DF}\right)$$

It can be seen that this scoring metric will produce larger scores for terms that have lower DF scores than for terms which have higher DF scores. For example, at the farthest extreme, if a given term has the maximum possible DF (where the DF score matches the number of documents in the training corpus), it can be seen that the log term of the formula will reduce to zero (log(1)), in which case the TFIDF score will be zero regardless of how high the TF score is. Thus, step 708 will produce a TFIDF score for each of the terms in the subject document 104.

At step 710, the term analyzer sorts the terms of document 104 by their TFIDF scores. Then, at step 712, the term analyzer can discard the terms whose TFIDF scores fall below a defined threshold. A practitioner can set this threshold to a value deemed useful for the system (e.g., a threshold of 0.1; although other values could be used). If desired, no threshold could be employed, and the system could report only a ranking of terms by their TFIDF scores so that a user can focus on the most unique terms if desired.

D. User Interfaces:

The AI platform 102 can support a wide variety of UIs 122 for interacting with the system. Through these UIs, users can upload documents for training and/or analysis by the platform 102. For example, a browser interface can be provided for uploading text documents 104 into the system. The AI platform 102 can then analyze the document 104 using the components shown by FIG. 1.

Figure 8:
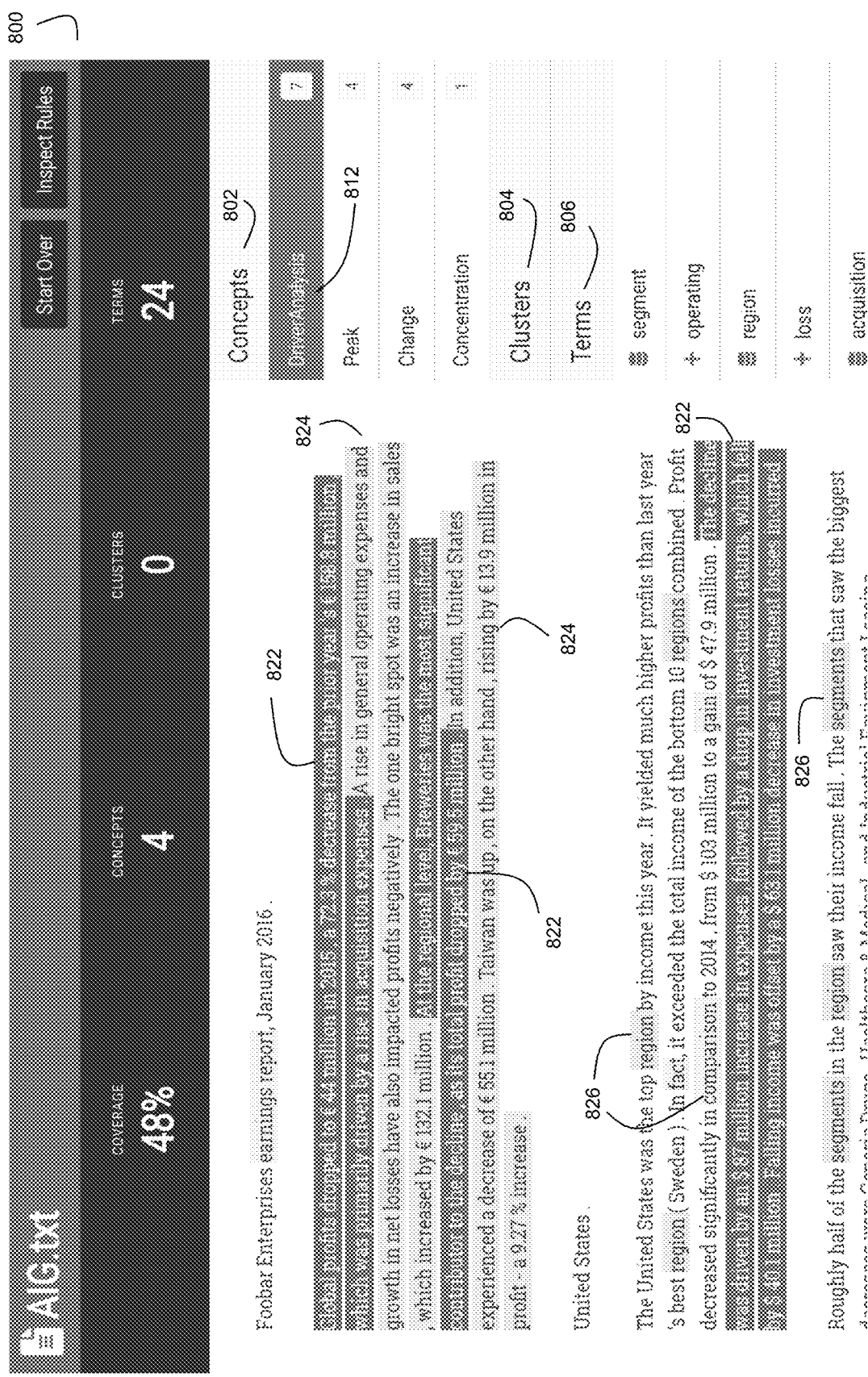
FIG. 8 shows an example graphical user interface (GUI) for reviewing the results of an analysis by the AI platform of FIG. 1.

FIG. 8 shows an example graphical user interface (GUI) 800 that presents the outcomes of the classification, clustering, and term discovery operations with reference to an input document 104 as discussed above. A main portion of the GUI can present the text of the subject document 104. A sidebar of the GUI can summarize analysis results via a concepts section 802, a clusters section 804, and a terms section 806. An upper section of the GUI 800 shows a summarization of the analysis results, including (1) a "coverage" percentage that identifies the percent of sentences in the document that were classified as expressing known concepts, (2) a count of the different concepts recognized by the classifier 106 in the document, (3) a count of the number of clusters identified by the clusterer 114 in the document, and (4) a count of the number of terms discovered by the term analyzer 118.

GUI 800 can be interactive with users in any of a number of ways. For example, users can interact with the sidebar to explore analysis results. Section 802 can include a list of each known concept recognized by the classifier 106 in the document. Section 804 can include a list of each cluster identified by the clusterer 114 in the document. Any clusters that are found can be identified by the corresponding root verb (e.g., see FIG. 12A). Section 806 can include a list of each term discovered by the term analyzer 118. Each term can be displayed alongside a graphical indicator that indicates whether the subject term is present as an entity type in the ontology for the system. For example, the cylindrical icon shown by FIG. 8 can denote that the subject term already has a corresponding entity type in the ontology, and the plus icon can denote that the subject term does not have a corresponding entity type in the ontology. The plus icon can be user-selectable to initiate a workflow for adding the subject term to the ontology as a new entity type or a new expression for an existing entity type (see, e.g., FIGS. 12A and 12B discussed below).

In the example of FIG. 8, it can be seen that the classifier 106 found hits with respect to the concepts "Driver Analysis", "Peak", "Change", and "Concentration". The sentences that have been classified with such concepts can be highlighted in some fashion in the text—for example highlighted sentences 822 can be classified with a different concept than highlighted sentences 824. The number alongside each listed concept identifies the count of sentences corresponding the subject concept that were found in the document. By selecting a listed concept, the GUI can further highlight the sentences that were classified as expressing that concept. For example, with reference to FIG. 8, a user can select the "Driver Analysis" listing 812, which can cause the GUI 800 to highlight the sentences in the document that were classified as expressing a "Driver Analysis" concept (see 822 in FIG. 8) in a manner that is different than the highlighting applied to the sentences 824 (e.g., a brighter highlighting such as a bright red highlighting; although it should be understood that different coloring schemes could be employed). The GUI 800 can also highlight unclassified sentences 824 in a manner that is different than the highlighting applied to sentences 822 and 824. The GUI 800 can also highlight terms 826 within the presented document that were found by the term analyzer 118.

Further interactivity can be provided to users through the presented sentences of the document. For example, a user can interact with the GUI 800 to select a sentence within the presented document (e.g., by hovering over or clicking on the sentence) to access additional information about the sentence and actively update the system. For example, users can interact with the platform 102 through GUI 800 to change, remove, and/or create a new concept to associate with a given sentence.

Figure 9:
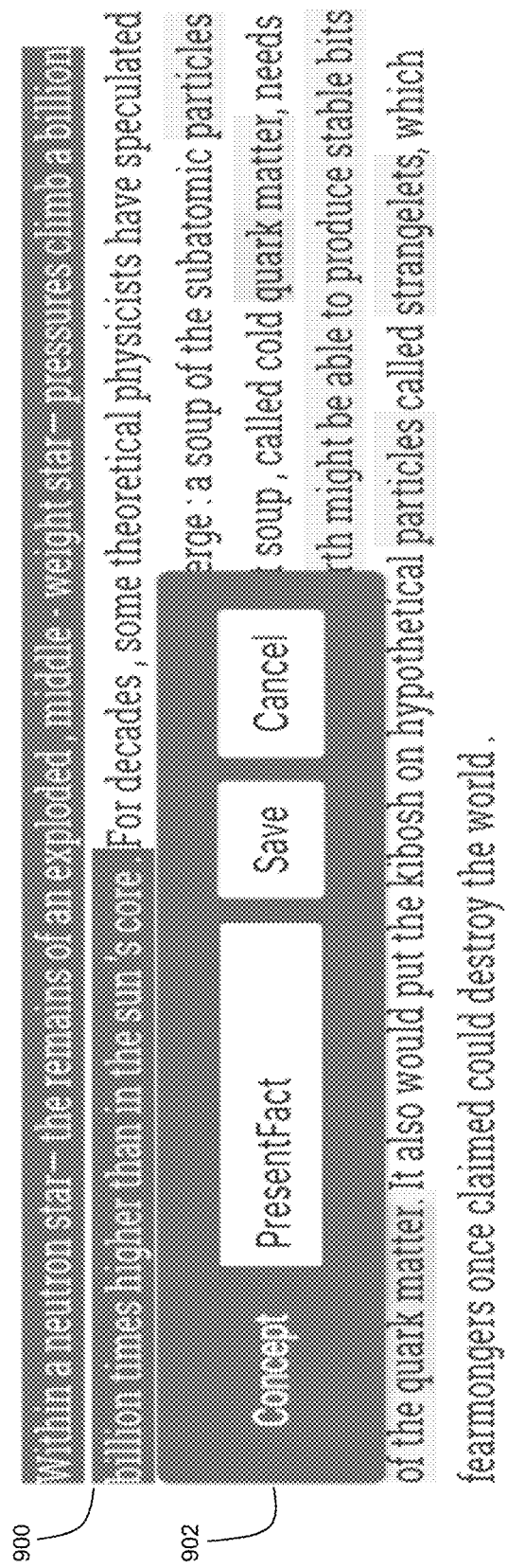
FIG. 9 shows an example GUI for reviewing a sentence classification produced by the classifier.

FIG. 9 shows an example where a user has selected sentence 900 from the main section of the GUI 800, which causes a popup window 902 to be displayed. In this example, sentence 900 had been classified by the classifier 106 as expressing a "Present Fact" concept. This classification is shown via window 902, and the user is given the option to save or cancel this classification. The user can also be given an option to change this classification, as described below with reference to FIGS. 10A and 10B.

FIG. 10A shows an example where a user has selected sentence 1000 from the main section of the GUI 800, which causes a popup window 1002 to be displayed. In this example, sentence 1000 had been unclassified by the classifier 106. In such a case, the popup window 1002 can provide the user with an option of assigning a concept classification to the subject sentence via field 1004 and an associated dropdown menu. The dropdown menu can provide a list of known concepts for the system, and the user can select from among these options for classifying the subject sentence. The window 1006 can also provide the user with the option of associating the subject sentence with a new concept via button 1006. Upon selection of button 1006, the user can be prompted for the name of the new concept.

FIG. 10B shows an example process flow for the platform 102 with respect to the options in FIG. 10A. At step 1010, the system receives a concept input from the user for an unclassified sentence. As shown by FIG. 10A, this concept input can be either an identification of an existing concept or the creation of a new concept. At step 1012, the system labels the subject sentence with the concept identified at step 1010. Then, at step 1014, the system retrains the classifier 106 by sending the newly concept-labeled sentence through classifier 106 in training mode as described above with reference to FIG. 2B. In doing so, the classifier 106 is trained to recognize sentences that share the same composition and structure with respect to the subject concept, and the classifier's classification tree structure is updated accordingly. Accordingly, FIGS. 10A and 10B describe a powerful capability of an example embodiment where the platform 102 can be easily trained and taught over time based on a feedback loop of input from users through GUI 800.

Figure 11B:
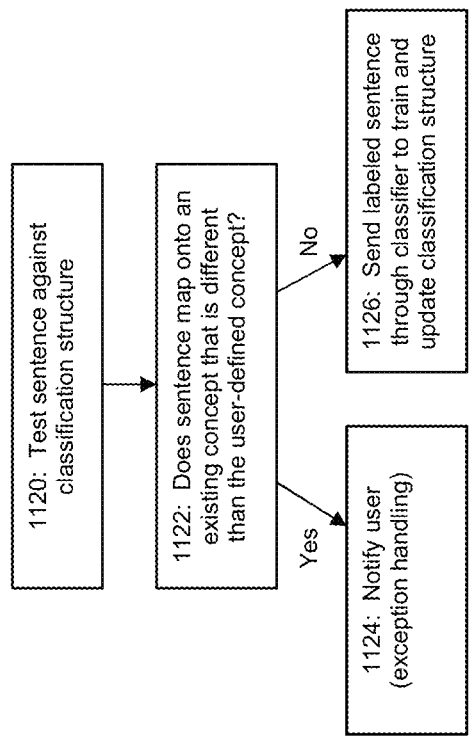
FIG. 11B shows an example process flow in relation to FIG. 11A.
Figure 11A:
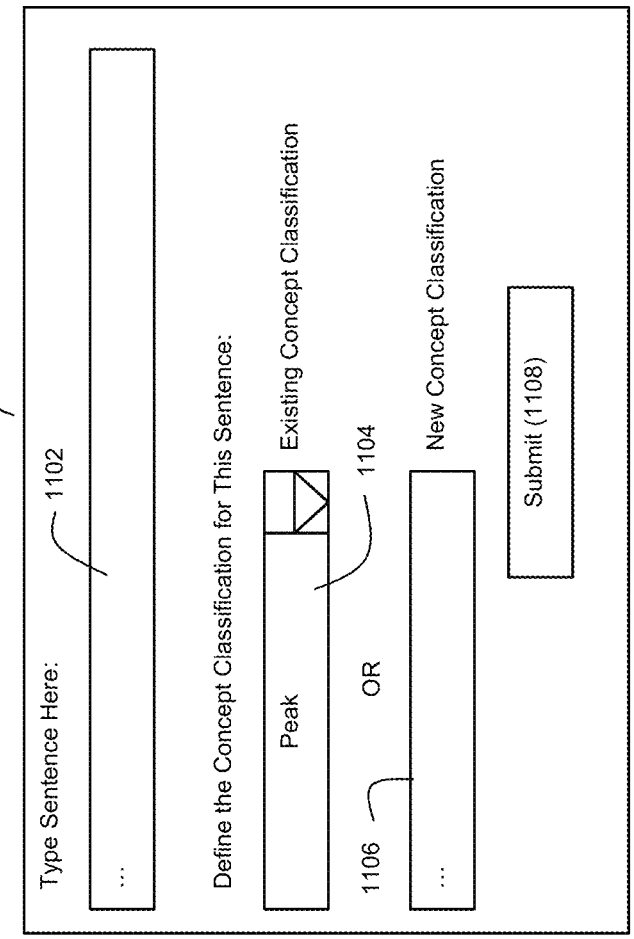
FIG. 11A shows an example GUI for forming concept-labeled sentences on the fly to train the classifier.

In another powerful example embodiment, users can interact with the system through a GUI 122 to teach the platform new concepts "on the fly" via user-entered sentences. FIG. 11A shows an example GUI 1100 that allows a user to type in a new sentence from scratch via field 1102. The user can then define a concept classification for this sentence via fields 1104 or 1006. Field 1104 is a field with a dropdown menu that allows a user to associate the sentence in field 1102 with any of the pre-existing known concepts for the system. Field 1106 is a text entry field that allows a user to identify a new concept to be associated with the sentence in field 1102. The user can then select a button such as the submit button 1108 to submit this sentence and concept classification to the platform 102. FIG. 11B shows an example process flow that can get triggered after a user enters a sentence in field 1102 and a concept classification in field 1104 or 1106. At step 1120, the system tests the subject sentence from field 1102 against the classifier's classification tree structure to determine whether it maps onto an existing concept that is different than the user-defined concept from fields 1104 or 1106 (step 1122). If the sentence maps onto an existing, different concept, then this could serve as a conflict within the classifier 106 if a practitioner wants the system to only have a single concept classification for a given sentence structure/composition. Accordingly, the process flow can then branch to step 1124 where the user is notified of the conflict and exception handling can be performed. For example, a UI could notify a user of the conflict and provide an option to block the change. The UI could also present the user with options for resolving the duplicate/conflicting rules. But, if step 1122 results in a conclusion that the classifier 106 did not map the subject sentence to a different concept, then the process flow can proceed to step 1126. At step 1126, the system retrains the classifier 106 by sending the newly concept-labeled sentence through classifier 106 in training mode as described above with reference to FIG. 2B. Thus, FIGS. 11A and 11B describe how users can interact with the AI platform 102 through UIs 122 to quickly form sentences that express a desired concept and then train the AI platform to recognize that concept.

Figure 12A:
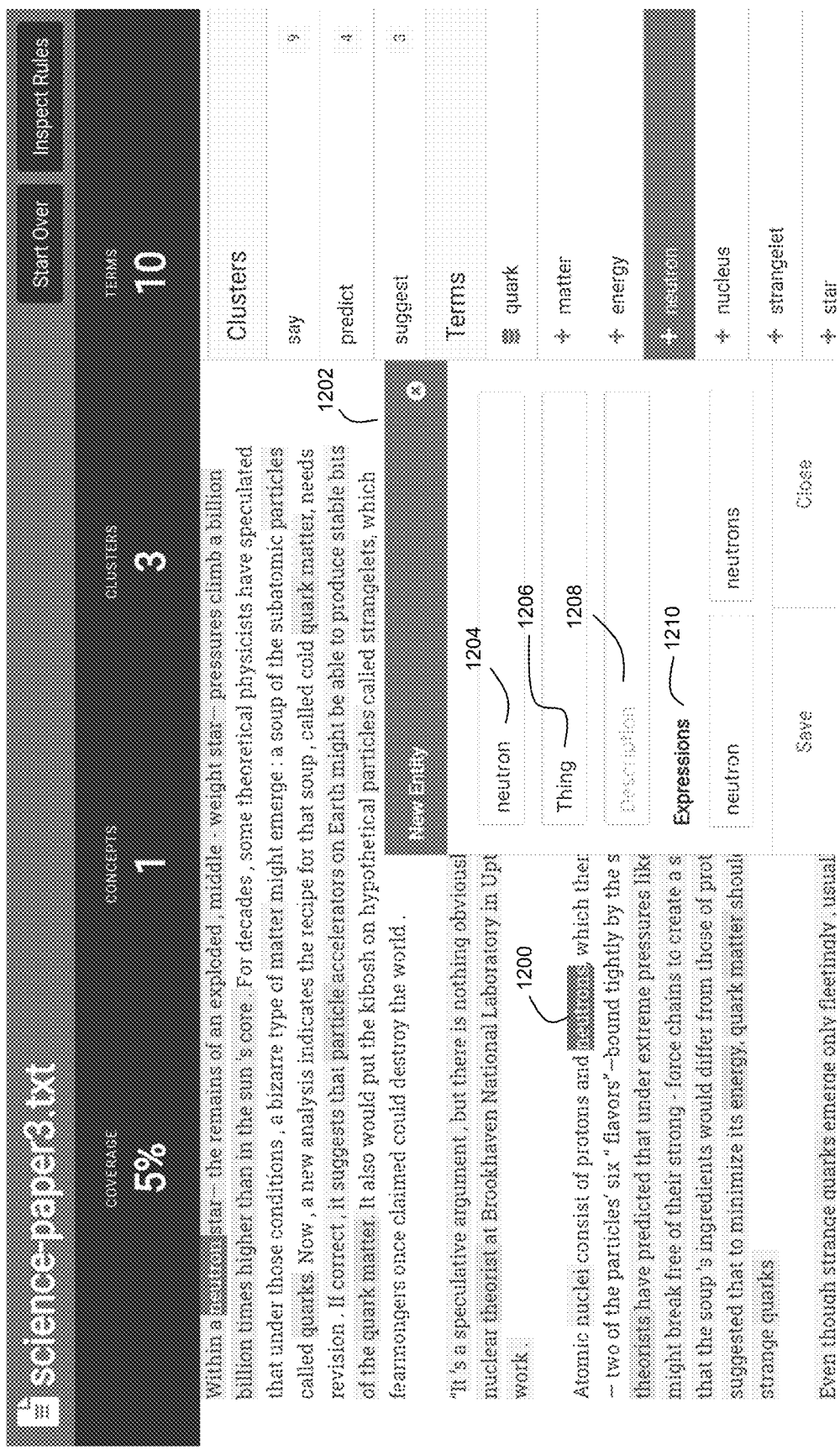
FIG. 12A shows an example GUI for updating an ontology based on the results of term discovery by the AI platform of FIG. 1.
Figure 12B:
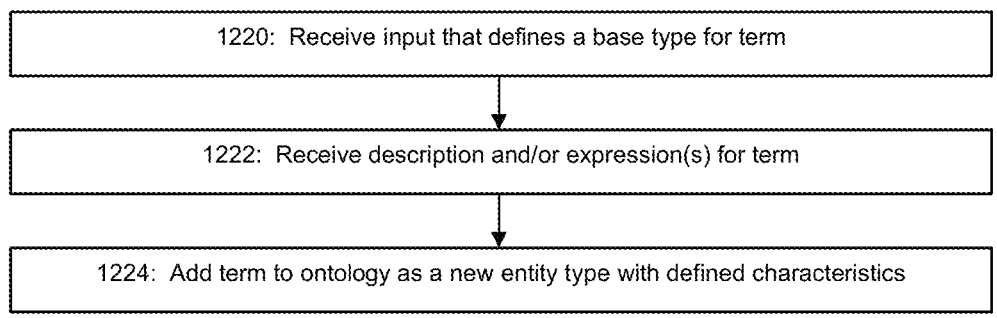
FIG. 12B shows an example process flow in relation to FIG. 12A.

FIG. 12A shows an example of how users can interact with the AI platform 102 through a GUI to add new entity types to the ontology for the system. Examples of ontologies that can be supported by the system are described in the above-referenced and incorporated patent applications, including the above-referenced and incorporated U.S. patent application Ser. Nos. 16/183,230, 16/183,270, and 15/897,350 (now U.S. Pat. No. 10,585,983). Through GUI 800, a user can select a term that is listed in section 806 or select a term from which the presented document; whereupon a popup window 1202 is presented. Through window 1202, the user can define the characteristics of the new entity type to be added to the ontology. FIG. 12B shows an example process flow for operations corresponding to user actions through window 1202.

The window 1202 can include a field 1204 that is populated with the selected term. This can serve as the name for a new entity type ontological element to be added to the ontology. Through field 1206, the user can define a base type for the new entity type (e.g., person, place, thing, etc.) (see also step 1220 of FIG. 12B). Through field 1208, the user can provide a description for the new entity type. This description can be useful for providing users with clarifying context about the new entity type. Section 1210 allows the user to define one or more expressions for the new entity type. An NLG system can then choose from among these expressions when deciding how to express the subject entity type in a sentence. Step 1222 of FIG. 12B corresponds to receiving inputs via 1208 and/or 1210. The "save" button can be selected to add the new entity type and its associated information to the ontology (see step 1224 of FIG. 12B). Accordingly, FIGS. 12A and 12B show how terms discovered by term analyzer 118 can be presented to a user through UIs 122 to permit users to update the system ontology with information about those terms to thereby teach the ontology about new entity types.

Figure 13:
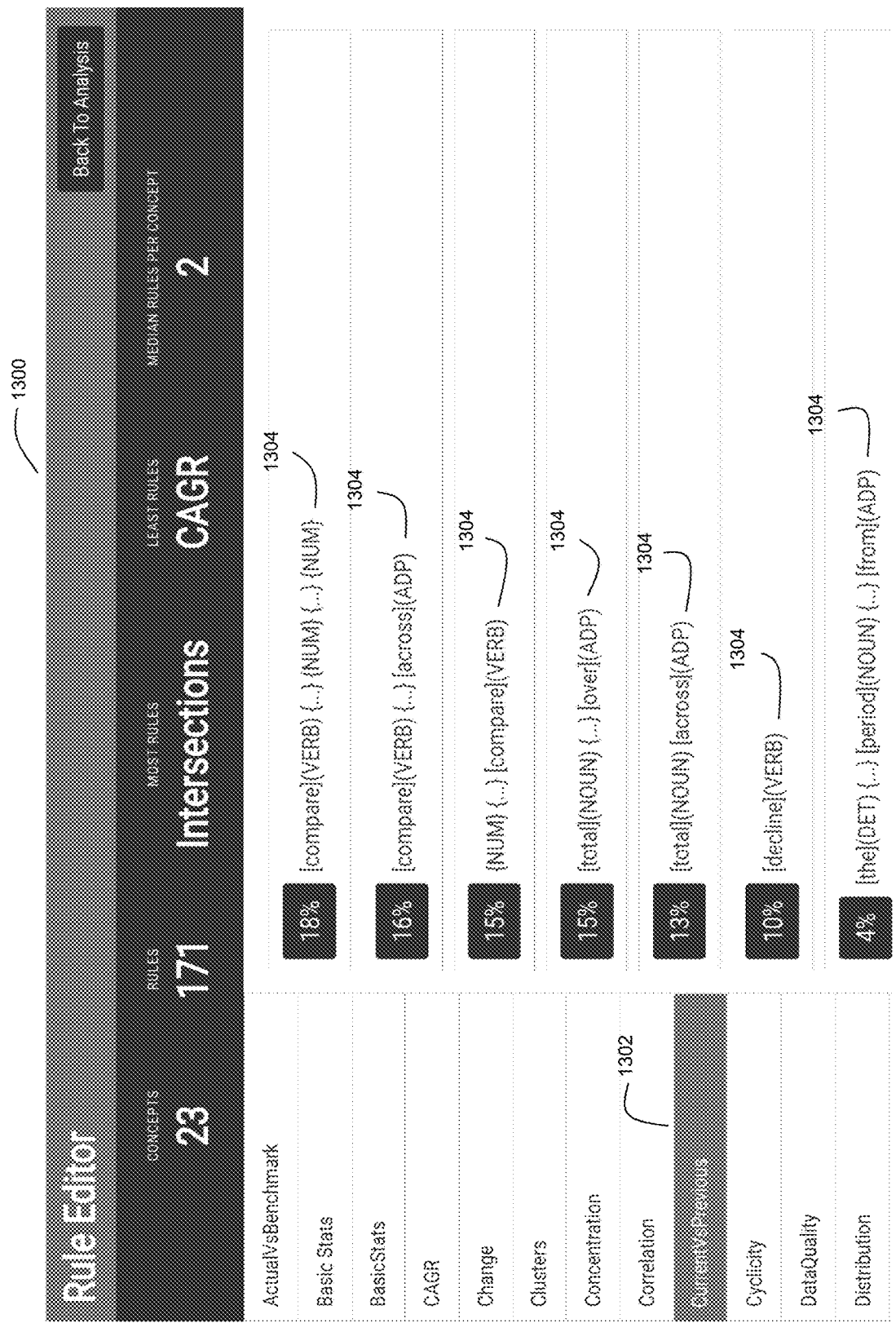
FIG. 13 shows an example GUI for reviewing the rules used by a classifier to distinguish between different concepts known to the system.

The UIs 122 can also permit users to review the rules used by classifier 106. FIG. 13 shows an example of such a GUI

1300. With reference to FIG. 8, GUI 1300 can be accessed in response to user selection of the "Inspect Rules" button of GUI 800. A sidebar section of GUI 1300 can list the different concepts for which the classifier 106 has rules. To review the rules linked to each concept, the user can select one of the listed concepts. This will cause the main section of GUI 1300 to list the rules that are associated with the subject concept. Thus, rules 1304 are displayed by GUI 1300 in response to user selection of the "Current vs Previous" concept 1302 from the sidebar. Each listed rule can also show a percentage that indicates the percentage of sentences in the training corpus 200 that were labeled with the subject concept and were hits on the subject listed rule. An upper section of GUI 1300 can show a summarization of the rules within the classifier 106, including (1) a count of the number of different concepts known to the classifier, (2) a count of the number of rules used by the classifier to distinguish between the different concepts, (3) an identification of the concept that has the most rules linked to it, (4) an identification of the concept that has the fewest rules linked to it, and (5) an identification of the median number of rules per concept. Thus, GUI 1300 allows a user to review the rules linked to concepts and make changes as may be appropriate. Optionally, GUI 1330 may allow a user to add a custom rule for a given concept through a UI that permits the user to enter the custom rule. Processing logic can then compare this rule with the existing rules in the system to assess whether the new rule would create a conflict with any of the existing rules. If the custom rules clears such a conflict check, then the custom rule can be added to the system for the subject concept.

E. Example Applications of NLU for NLG Training:

As discussed above, the NLU techniques described herein for AI platform 102 can be used to improve how NLG systems are trained. For example, the above-referenced and incorporated U.S. patent application Ser. No. 16/444,649 (now U.S. Pat. No. 10,706,236) describes how an NLG system can be trained to produce natural language output that is stylistically similar to a training natural language sentence. As described with reference to FIGS. 16 and 18 below (see also the above-referenced and incorporated U.S. patent application Ser. No. 16/444,649 (now U.S. Pat. No. 10,706,236), the training of the NLG system can employ various concept expression pattern matchers. The concept rules produced by the NLU AI platform 102 (e.g., prefix tree structure 362) can be used as the concept expression pattern matchers shown by FIG. 16 discussed below (and which is described in greater detail by the above-referenced and incorporated U.S. patent application Ser. No. 16/444,649 (now U.S. Pat. No. 10,706,236).

Figure 14:
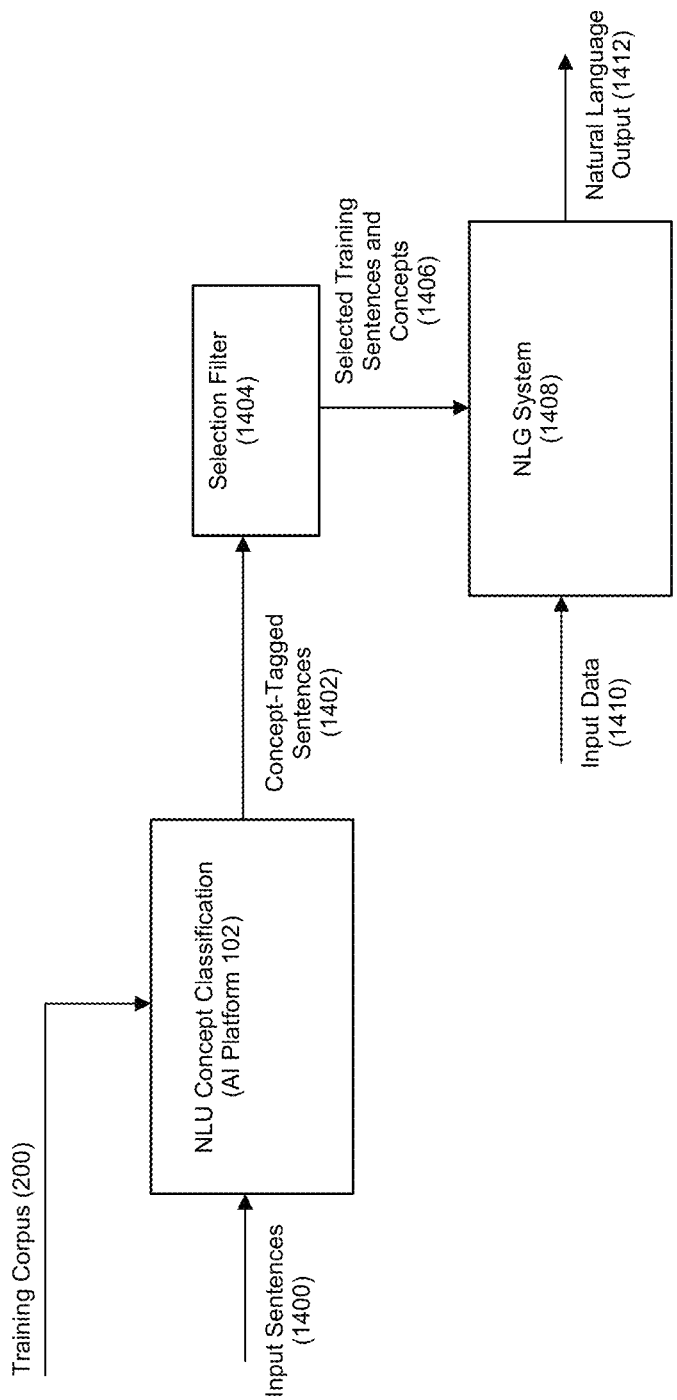
FIG. 14 shows an example system where a trained NLU concept classifier is used to facilitate the training of an NLG system.

As another example, FIG. 14 shows an example where the NLU AI platform 102 can be used to supplement the training of an NLG system 1408. In this example, the NLU AI platform 102 is trained by training corpus 200 using the techniques described in FIG. 2B. The NLU AI platform can then classify input sentences 1400 using the classification structure produced as a result of such training (e.g., see FIG. 4 discussed above). This produces a set of concept-tagged sentences 1402. A selection filter 1404 can then be applied to the concept-tagged sentences 1402 to decide which of those sentences 1402 will be used to train the NLG system 1408. For example, a user can select which of the concept-tagged sentences 1402 should be used as exemplars for expressing a given concept (See 1406). The selected sentences (and their associated concepts) can then be used to train the NLG system 1408 so that the NLG system, when producing a sentence that is intended to express that same concept, will produce a natural language output that stylistically resembles the selected training sentence. In this fashion, the NLG system 1408 can process input data 1410 to produce natural language output 1412 describing that input data 1410 in a manner that stylistically resembles that selected sentences/concepts 1406. Once again, the above-referenced and incorporated U.S. patent application Ser. No. 16/444,649 (now U.S. Pat. No. 10,706,236) describes an example of a trainable NLG system 1408 in this regard.

For example, above-referenced and incorporated U.S. patent application Ser. No. 16/444,649 discloses a trainable NLG system 1408 that uses NLP to detect a plurality of linguistic features in training data, wherein the training data comprises a plurality of words arranged in a natural language. These detected linguistic features are then aggregated into a specification data structure that is arranged for training the NLG system to produce natural language output that stylistically resembles the training data. This specification data structure can comprise a machine-readable representation of the detected linguistic features. Parameters in the specification data structure can be linked to objects in an ontology used by the NLG system to facilitate the training of the NLG system based on the detected linguistic features. Additional details about example embodiments for specification data structures are provided by above-referenced and incorporated U.S. patent application Ser. No. 16/444,649.

In a particularly powerful example embodiment described by above-referenced and incorporated U.S. patent application Ser. No. 16/444,649, the detected linguistic features can include concept expression templates that model how a concept is expressed in the training data. Examples of concepts that can be modeled in this fashion from the training data include change concepts, compare concepts, driver concepts, and rank concepts. In an example embodiment, to detect and extract such concept expression templates from the training data, the training data can be scanned for the presence of one or more anchor words, where each anchor word is associated with a concept understood by the system. If an anchor word is present in the training data, the system can then process the training data to extract an expression template that models how the concept associated with the present anchor word is discussed in the training data. NLP parsing can be applied to the training data and linkages to NLG ontologies can be employed to facilitate this concept expression template extraction.

Figure 15:
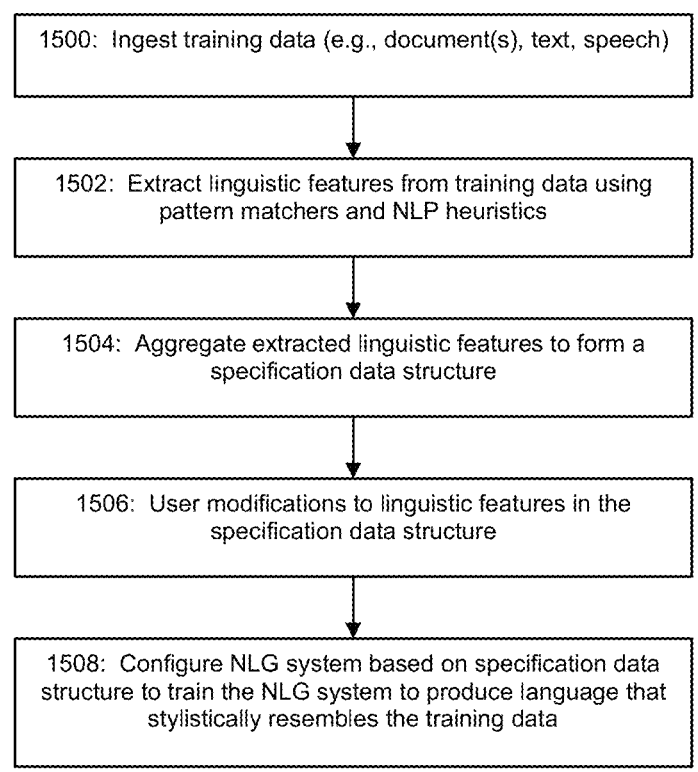
FIG. 15 discloses an example process flow for NLP-based training of an NLG system.

FIG. 15 depicts an example process flow for execution by one or more processors to train the NLG system 1408. At step 1500, a processor ingests the training data. For example, as noted, the training data can take the form of a corpus of documents that are represented by files. The documents can be ingested, converted into raw text strings, and saved for use by the NLG system 1408 (for example, in a relational database as one document per row). The same process can be followed for text inputs and speech inputs, albeit the volume of data will likely be lower in such instances. Also, if desired, multiple files can be ingested at step 1500 using techniques such as multi-part, form-encoded HTTP POST. In the context of FIG. 14, this training data can be the training sentences 1406 selected by selection filter 1404. As noted above, these training sentences 1406 can serve as exemplars for expressing the concept with which they were tagged by AI platform 102.

At step 1502, a processor extracts linguistic features from the ingested training data using a variety of pattern matchers and rule-based NLP heuristics, examples of which are discussed below and in above-referenced and incorporated U.S. patent application Ser. No. 16/444,649. Using these techniques, specific linguistic features can be detected in and extracted from each document, and each document can be converted into a data structure (e.g., a JSON data structure) that contains linguistic feature metadata.

At step 1504, a processor aggregates the extracted linguistic features produced from the documents at step 1502 by iterating over the document-specific data structures. This can include deriving totals, percentages, grouping, and sorting, which operates to produce a specification data structure (e.g., a JSON specification data structure, which is a machine-readable description of the linguistic features extracted from the ingested training data.

At step 1506, a user interface (e.g., a browser-based graphical user interface (GUI)) can process the specification data structure and present a user with the linguistic features discovered by steps 1502 and 1504. Through the user interface, the user can elect to discard any of the discovered linguistic features. In example embodiments, the user can also enter custom sentences into the user interface to add additional ontological vocabulary to the system and/or add concept expressions to the specification. However, as noted above, such user interaction can be omitted if desired by a practitioner.

At step 1508, a processor configures the NLG system 1408 based on the specification data structure to thereby train the NLG system 1408 to produce language that stylistically resembles the training data 1406. In an example embodiment, a platform-specific applicator can take the JSON specification data structure (and any user preferences) as inputs and update the appropriate configuration within the NLG system 1408.

The NLG system 1408 can then use the specification data structure to update its configuration information to control how it produces natural language output 1412. In an example embodiment, the NLG system 1408 can produce NLG output 1412 about a data set based on defined configurations such as parameterized communication goal statements, for example using the techniques described in one or more of the above-referenced and incorporated patents and patent applications.

Figure 16:
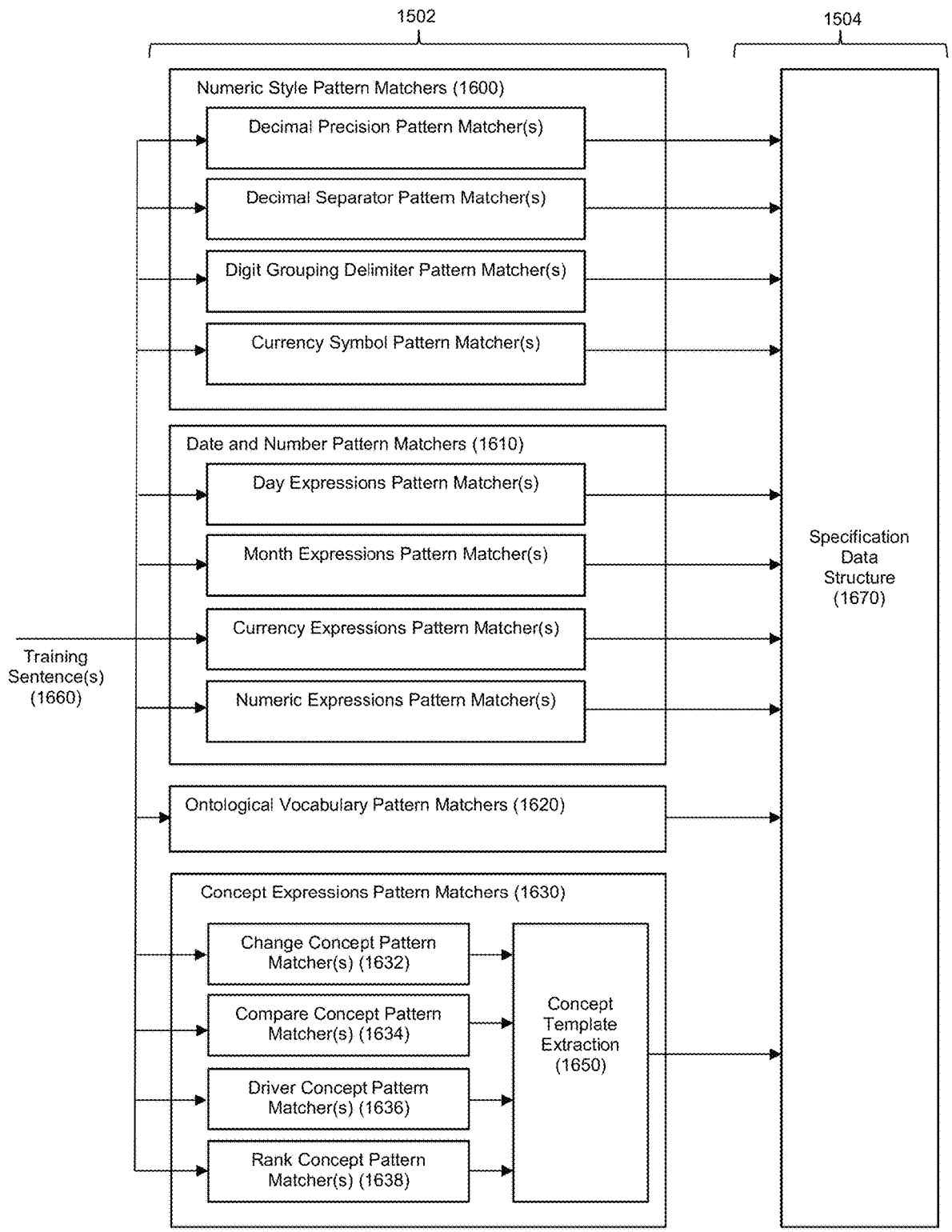
FIG. 16 shows an example process flow for extracting linguistic features from training data and aggregating the extracted linguistic features into a specification data structure.

FIG. 16 depicts an example architecture for implementing steps 1502 and 1504 within the NLG system 1408. A variety of different pattern matchers can be employed to detect and extract linguistic features from the training data 1660. These pattern matchers can be implemented in software code within the NLG system 1408. In an example embodiment, the pattern matchers can employ regular expression (RegEx) pattern matching where regular expressions are used to define the patterns sought via the matching process. In example embodiments, the trainable NLG system 1408 can include numeric style pattern matchers 1600 (which may include one or more decimal precision pattern matchers, decimal separator pattern matchers, digit grouping delimiter pattern matchers, and/or currency symbol pattern matchers), date and number pattern matchers 1610 (which may include one or more day expressions pattern matchers, month expressions pattern matchers, currency expressions pattern matchers, and/or numeric expressions pattern matchers), ontological vocabulary pattern matchers 1620, and concept expressions pattern matchers 1630. Examples of each of these are discussed in above-referenced and incorporated U.S. patent application Ser. No. 16/444,649, and a discussion of the concept expression pattern matchers 1630 is included below. The linguistic features detected and extracted via the pattern matchers can then be aggregated into a specification data structure 1670.

The concept expressions class of linguistic features is concerned with the sequence of words or phrases used in the training data to express NLG concepts. Concept expressions pattern matchers 1630 can be used to infer the high level concepts that are expressed in the training data, and they thus represent a particularly powerful and innovative aspect that can be employed in example embodiments of trainable NLG system 1408. Examples of concepts that can be detected by pattern matchers 1630 include:

Change: An example of a sentence that expresses a change concept is "Imports of steel fell sharply in 2018, down 43% from the previous year."

Compare: An example of a sentence that expresses a compare concept is "Imports of steel were lower in 2018 than the previous year."

Driver: An example of a sentence that expresses a driver concept is "New tariffs contributed to the decrease in steel imports."

Rank: An example of a sentence that expresses a rank concept is "The top 3 steel exporters by volume are China, Russia, and India."

The concept expressions pattern matchers 1630 can use metadata derived from NLP tools and a series of rule-based heuristics to identify candidates for concept expressions, ultimately producing an annotated template that can be structurally compatible with the NLG system 1408.

The system can be configured to assume that all concept expressions contain an anchor word, a single or compound word that is globally unique to a particular concept. The system can then use occurrences of these anchor words to identify candidate phrases for template extraction. Examples of specific anchor words for several concepts are listed below.

For example, one or more change concept pattern matchers 1632 can be configured to detect the presence of any of the following anchor words in a training sentence. Upon detection of one of these anchor words, the subject training sentence can be categorized as a candidate for a change expression and get passed to template extraction logic 1650 (discussed below). Examples of anchor words for a change concept can include:

increase
reduction
decrease
decline
rise
fall
raise
lower
lift
drop
grow
shrink
gain
lose
up
down
improve
worsen
slump
upturn
downturn
gains
losses As another example, one or more compare concept pattern matchers 1634 can be configured to detect the presence of any of the following anchor words in a training sentence.

Upon detection of one of these anchor words, the subject training sentence can be categorized as a candidate for a compare expression and get passed to template extraction logic 1650 (discussed below). Examples of anchor words for a compare concept can include:
- more
- less
- fewer
- greater
- lesser
- higher
- lower
- superior
- inferior
- exceed As another example, one or more driver concept pattern matchers 1636 can be configured to detect the presence of any of the following anchor words in a training sentence. Upon detection of one of these anchor words, the subject training sentence can be categorized as a candidate for a driver expression and get passed to template extraction logic 1650 (discussed below). Examples of anchor words for a driver concept can include:
- drive
- detract
- contribute
- aid
- counteract
- help
- hurt
- impact As another example, one or more rank concept pattern matchers 1638 can be configured to detect the presence of any of the following anchor words in a training sentence. Upon detection of one of these anchor words, the subject training sentence can be categorized as a candidate for a rank expression and get passed to template extraction logic 1650 (discussed below). Examples of anchor words for a rank concept can include:
- best
- worst
- top
- bottom
- top most
- bottom most
- top ranked
- bottom ranked
- largest
- smallest However, it should be understood that more, fewer, and/or different anchor words can be used for detecting these concept candidates. For example, a thesaurus could be used to find appropriate synonyms for each of these anchor words to further expand the pools of "change", "compare", "driver", and "rank" anchor words.

Furthermore, while the examples discussed herein describe "change", "compare", "driver", and "rank" concepts, it should be understood that a practitioner may choose to detect other concepts that could be present within training data. For example, any of "peaks and troughs" concepts, "volatility" concepts, "correlation" concepts, "prediction" concepts, "distribution" concepts, and others can also be detected using the techniques described herein. Following below are some additional examples of concepts that can be expressed in sentences and for which concept expression templates could be extracted using the techniques described herein:

"Actual versus Benchmark" Concept: "The best period was October when Total Likes outperformed Fan Acquisition Target Goal by 7.537."

"Compound Annual Growth Rate" (CAGR) Concept: "If that growth rate were to continue, Sale Volume is forecast to be $7.34 billion by 2022."

"Clusters" Concept: "When organized into groups of similar Stadiums and Capacity values, one distinct group stands out. There were 28 entities that had values of Stadiums between three and 17 and Capacity between zero and 165,910."

"Concentration" Concept: "Crime Count is relatively concentrated with 60% of the total represented by 35 of the 161 entities (22%)."

"Correlation" Concept: "Profit and revenue had a strong positive correlation, suggesting that as one (profit) increases, so does the other (revenue), or vice versa."

"Current versus Previous" Concept: "Compared to the previous year, the average across all months decreased from $92.7 million to $84.2 million."

"Cyclicity" Concept: "Sale Volume experienced cyclicality, repeating each cycle about every 8.2 years."

"Distribution" Concept: "The distribution is negatively skewed as the average of 4.2 million is greater than the median of 4.2 million."

"Intersection" Concept: "Total Quantity was lower than Total Revenue for the first 6% of the series, but at February 2010 Total Quantity increased above Total Revenue and remained higher for the last 94% of the series."

"Min Max" Concept: "Values ranged from 54% (Easy System Chat) to 118% (Phone)."

"Outliers" Concept: "PASSAT and JETTA were exceptions with very high Miles Per Gallon values."

"Percentage of Whole" Concept: "Over the course of the series, Honduras accounted for 15% of top keyword totals, election accounted for 9.92%, and president accounted for 8.74%."

"Peak/Trough" Concept: "Total Sales had a significant dip between February-2013 ($7,125) and May-2013 ($7,417), falling to $5,430 in March-2013."

"Segments" Concept: "Total Contacts Completed fluctuated over the course of the series with 60% of data points moving in an opposite direction from the previous point."

"Streak" Concept: "The largest net growth was from August 2017 to December 2017, when Variable (Line) increased by 36 percentage points."

Further still, while a single anchor word is used to assign a candidate concept classification to training sentences in the example embodiment discussed above, it should be understood that a practitioner could also use an anchor word in combination with additional metadata (such as part of speech tagging) or a combination of anchor words to infer concepts from training sentences. For example, a practitioner may conclude that the word "fewer" could be indicative of both a "change" concept and a "compare" concept, and additional words and/or rules could be used to further resolve which classification should be applied to the subject training sentence. As another example, the detection of a rank concept when the word "top" is present in the training data can be made dependent on whether "top" is being used in the subject sentence as an adjective (in which case the rank candidacy can get triggered) or as a noun (in which case the rank candidacy may not get triggered).

Figure 17:
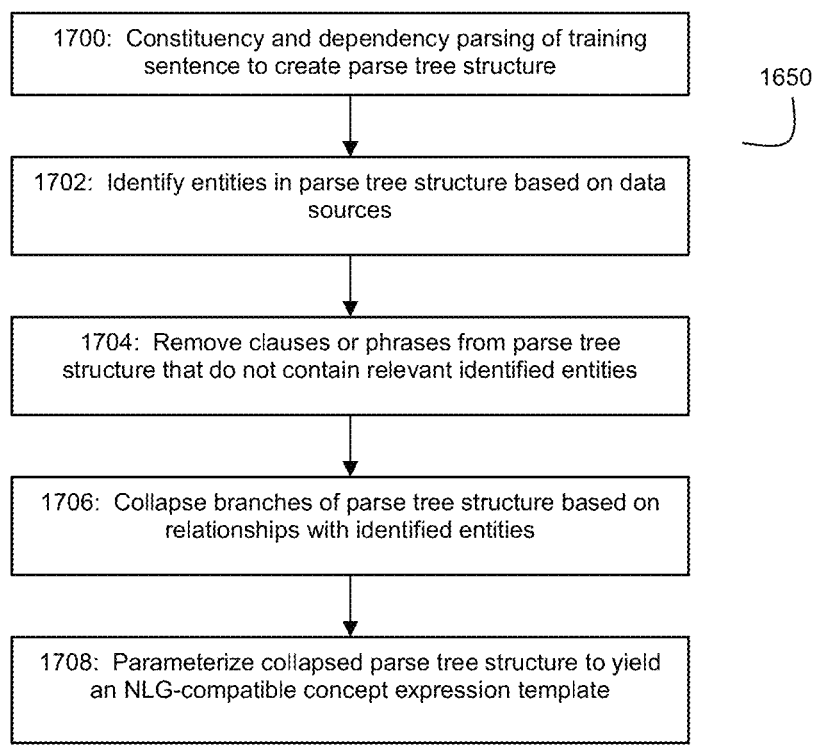
FIG. 17 shows an example process flow for detecting and extracting concept expression templates from training data.

Once candidate phrases have been identified via the anchor word detection, the candidate phrases are then parsed and evaluated by template extraction logic 1650 before producing a concept expression template. The template creation process can employ a sequence of rule-based heuristics. For example, FIG. 17 discloses an example process flow for template extraction. At step 1700, a processor performs constituency parsing and dependency parsing on the training sentence to create a parse tree structure. At step 1702, a processor identifies entities in the parse tree structure based on data sources such as an ontology. This step can be performed using named entity recognition (NER) techniques, and an example of an NER technique that can be performed on the parse tree structure is described in the above-referenced and incorporated U.S. patent application Ser. No. 16/444,649. However, the NER of step 1702 need not draw from the ontology used by NLG system 1408; instead the ontology used by the NER of step 1702 can use existing ontologies that are available in combination with parsing tools that can be used at step 1700. Entities that can be identified at step 1702 (even if the NLG system's ontology is not used) can include organizations, person names, dates, currencies, etc. At step 1704, a processor prunes clauses in the parse tree structure by removing clauses or phrases from the parse tree structure that do not contain relevant identified entities. At step 1706, a processor collapses branches of the pruned parse tree structure based on relationships with identified entities. For example, step 1706 can discard sibling tree nodes of any branches with known entities or attributes. At step 1708, a processor parameterizes the collapsed parse tree structure to yield an NLG-compatible concept expression template. The NLG-compatible concept expression template can include semantically-significant variable slots. Also, the parameterization step 1708 can include concept-specific rules. For example, the parameterization of a change concept can look for numeric values and then separately parameterize "from" and "to" values in a change expression. Additional details about example embodiments for template extraction can be found in the above-referenced and incorporated U.S. patent application Ser. No. 16/444,649.

Figure 18:
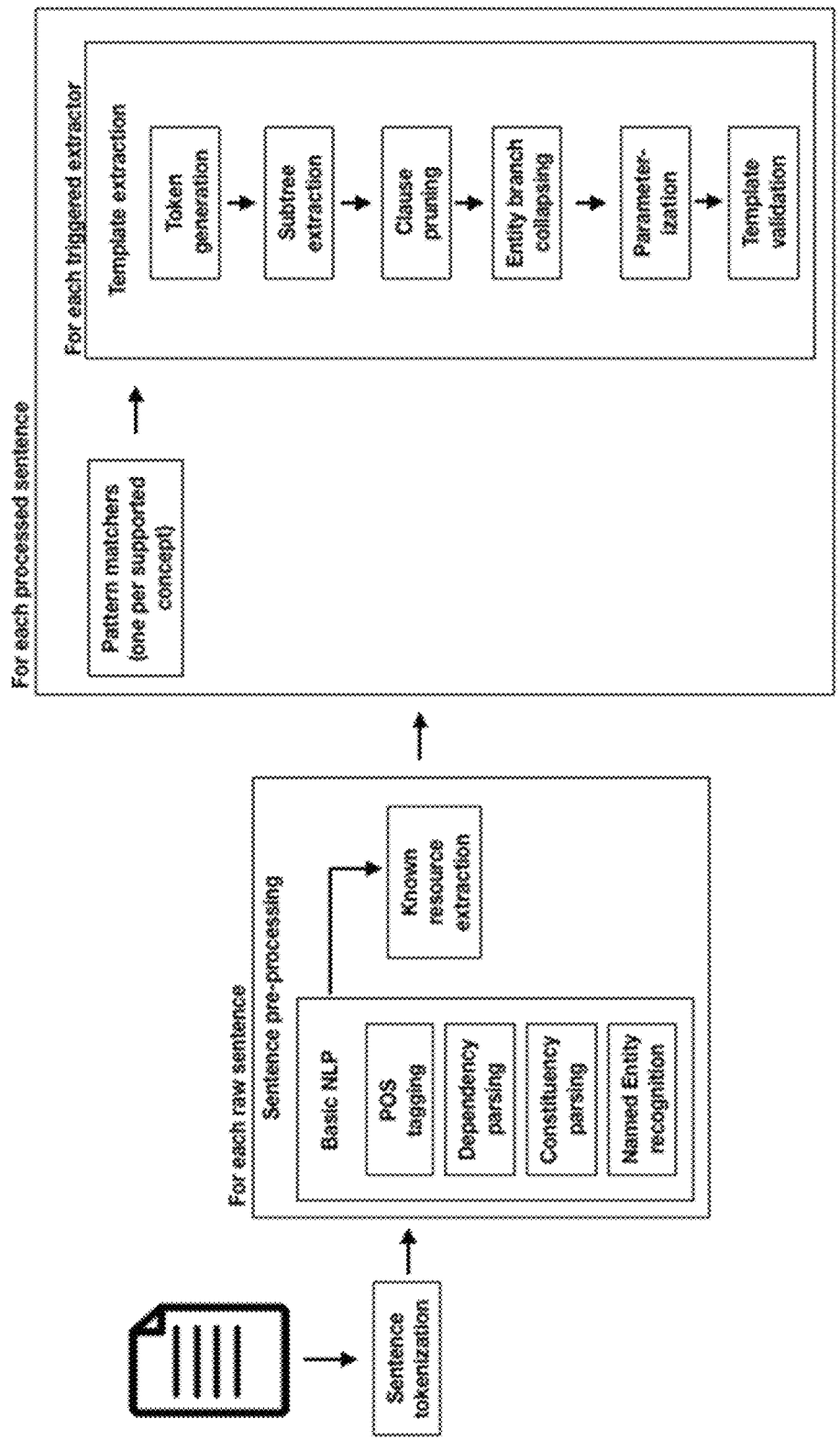
FIG. 18 shows another example schematic for end-to-end detection and extraction of concept expression templates from training data.

FIG. 18 shows an end-to-end process flow for extracting concept expression templates from training data for another example embodiment. This process flow can include the following:
1. Tokenizing a document into sentences
2. For each sentence:
    a. Pre-processing with a suite of NLP techniques (dependency and constituency parsing, named entity recognition)
    b. Leveraging a user's' data and the NLG system's ontology to identify and flag known resources (entities, attributes)
3. For each pre-processed sentence:
    a. Passing the sentence through a separate pattern matcher for each concept supported by the NLG system
    b. For each template extractor triggered by its associated pattern matcher, applying a set of heuristics to extract the relevant subtree from the parsed sentence and parameterize the sentence into a form compatible with the NLG system.

Through this process, a raw sentence like "The United States saw a $5000 increase in sales in the cycle ending in February." can be converted to a parameterized template of the form "$ENTITY_0 see $BY-VALUE_0 ANCHOR_0 in $ATTR_0 in $DATE_0" that can be used by the NLG system 1408 to generate new sentences of a similar form. Additional details about example embodiments for the FIG. 18 process flow can be found in the above-referenced and incorporated U.S. patent application Ser. No. 16/444,649.

F. Application Programming Interface (API):

The AI platform 102 can provide an API for programmatic interaction with the system and UIs. As an example, the API can be an HTTP REST API. As examples, the following frameworks can be used for a number of different programmatic interactions with the system and UIs.

```
Get a sentence's concept classification:
    Endpoint
    PUT /classification/
    Request body (JSON)
    {"sentence": "an arbitrary sentence to classify"}
    Response (JSON)
    {"concept": "name of concept"}
Get sentence clusters:
    Endpoint
    PUT /clusters
    Request body (JSON)
    [
        ["sentence_id1", "an arbitrary sentence to cluster"],
        ["sentence_id2", "another arbitrary sentence to cluster"]
    ]
    Response (JSON)
    [
        {
            "cluster_name": "cluster1",
            "sentences": [
                "sentence_id1",
                "sentence_id2"
            ]
        }
    ]
Get TFIDF scores:
    Endpoint
    PUT /term_scores/
    Request Body (JSON)
    [
        "sales",
        "person"
    ]
    Response (JSON)
    [
        ["sale_NOUN", 0.823],
        ["person_NOUN", 0.510]
    ]
Train classifier with a new sentence:
    Endpoint
    PUT /classifier/sentence
    Request body (JSON)
    {
        "sentence": "a sentence expressing concept1",
        "concept": "concept1"
    }
    Response (JSON)
    {"status": "ok"}
Analyze document for concepts, clusters, and terms:
    Endpoint
    POST /analysis/
    Request body (multipart/form-data)
    (Text file)
    Response (JSON)
    {
        "clusters": [
            [
                "predict",
                4
            ],
            [
                "suggest",
                3
            ]
        ],
        "concepts": [
            [
                "Intersection",
                [
                    "f7cba7f267cf43a2b99a42228d899cba",
```

```
            "d899f4a922ae4587b2693d19d688ba09"
          ]
        ]
      ],
      "document": {
        "id": "e803071b5ba84024b7b95876de8a0fc6",
        "nodes": [
          {
            "cluster": null,
            "concept": "Intersection",
            "id": "f7cba7f267cf43a2b99a42228d899cba",
            "nodes": [
              {
                "text": "Within a ",
                "type": "text"
              },
              {
                "ontology_id": null,
                "original_text": "neutron ",
                "significant": true,
                "text": "neutron ",
                "token": "neutron_NOUN",
                "type": "token"
              },
              {
                "ontology_id": null,
                "original_text": "star",
                "significant": true,
                "text": "star",
                "token": "star_NOUN",
                "type": "token"
              },
              {
                "text": "\u2014 the remains of an exploded , middle - weight ",
                "type": "text"
              },
              {
                "ontology_id": null,
                "original_text": "star",
                "significant": true,
                "text": "star",
                "token": "star_NOUN",
                "type": "token"
              },
              {
                "text": "\u2014 pressures climb a billion times higher than in the sun \u2019s core . ",
                "type": "text"
              }
            ],
            "original_text": "Within a neutron star\u2014the remains of an exploded, middle-weight star\u2014pressures climb a billion times higher than in the sun\u2019s core.",
            "type": "sentence"
          }
        ],
        "type": "document"
      },
      "entity_types": {
        "1db531ef-c883-41cd-8926-d3d9014d9558": {
          "base_type": "thing",
          "expressions": [
            {
              "plural": "quarks",
              "singular": "quark"
            }
          ],
          "id": "1db531ef-c883-41cd-8926-d3d9014d9558",
          "label": "quark",
          "name": "quark"
        },
        "9d3c15a1-e986-46df-868d-8442fa078d87": {
          "base_type": "place",
          "expressions": [
            {
              "plural": "places",
              "singular": "place"
            },
```
```
            {
              "plural": "places",
              "singular": "place"
            }
          ],
          "id": "9d3c15a1-e986-46df-868d-8442fa078d87",
          "label": "place",
          "name": "place"
        }
      },
      "stats": {
        "clusters": 3,
        "concepts": 1,
        "coverage": 4.651162790697675,
        "terms": 10
      },
      "tokens": [
        [
          "quark_NOUN",
          0.7049254841255838,
          "1db531ef-c883-41cd-8926-d3d9014d9558"
        ],
        [
          "matter_NOUN",
          0.477530166665718,
          null
        ],
        [
          "energy_NOUN",
          0.18191625396789257,
          null
        ],
        [
          "neutron_NOUN",
          0.159176722221906,
          null
        ],
        [
          "nucleus_NOUN",
          0.159176722221906,
          null
        ],
        [
          "strangelet_NOUN",
          0.13643719047591943,
          null
        ],
        [
          "star_NOUN",
          0.11369765872993284,
          null
        ],
        [
          "particle_NOUN",
          0.11369765872993284,
          null
        ],
        [
          "theorist_NOUN",
          0.11369765872993284,
          null
        ],
        [
          "mass_NOUN",
          0.11369765872993284,
          null
        ]
      ]
    }
```

While the invention has been described above in relation to its example embodiments, various modifications may be made thereto that still fall within the invention's scope. Such modifications to the invention will be recognizable upon review of the teachings herein.

What is claimed is:

1. A method for applying artificial intelligence technology to natural language understanding, the method comprising:

from a training corpus of sentences, a processor generating reference counts for each of a plurality of terms within the sentences of the training corpus, wherein each reference count identifies how many sentences of the training corpus that its associated term appears in;

for the sentences in the training corpus that are part of a common document, the processor generating term frequency counts for each of a plurality of terms within the sentences of the common document, wherein each term frequency count identifies how many times that the associated term appears in the common document;

for each of a plurality of the terms, the processor computing a score based on the reference count and the term frequency count for that term that reflects a uniqueness of that term relative to the training corpus; and the processor providing a user interface (UI) through which a user reviews the terms having a uniqueness score above a defined threshold.

2. The method of claim 1 further comprising:
the processor sorting a plurality of the terms based on their uniqueness scores.

3. The method of claim 1 further comprising:
the processor providing a user interface (UI) through which a user provides input for adding at least one of the terms to an ontology for a natural language generation system.

4. The method of claim 3 further comprising:
in response to user input through the provided UI, the processor adding the at least one term to the ontology as a new entity type within the ontology.

5. The method of claim 4 further comprising:
the natural language generation system using the ontology to generate a natural language output that describes a data set.

6. The method of claim 3 further comprising:
in response to user input through the provided UI, the processor adding the at least one term to the ontology as a new expression for an existing entity type within the ontology.

7. The method of claim 6 further comprising:
the natural language generation system using the ontology to generate a natural language output that describes a data set, wherein the natural language output includes the new expression to express the existing entity type within a sentence.

8. The method of claim 3 wherein the UI for adding at least one of the terms to the ontology includes fields for user entry to define a name, base type, and one or more expressions for the new entity type.

9. The method of claim 1 wherein the processor comprises a plurality of processors that perform one or more different steps of the method.

10. The method of claim 1 wherein the processor comprises one processor that performs the method.

11. An applied artificial intelligence apparatus for natural language understanding, the apparatus comprising:
a processor configured to (1) from a training corpus of sentences, generate reference counts for each of a plurality of terms within the sentences of the training corpus, wherein each reference count identifies how many sentences of the training corpus that its associated term appears in, (2) for the sentences in the training corpus that are part of a common document, generate term frequency counts for each of a plurality of terms within the sentences of the common document, wherein each term frequency count identifies how many times that the associated term appears in the common document, (3) for each of a plurality of the terms, compute a score based on the reference count and the term frequency count for that term that reflects a uniqueness of that term relative to the training corpus, and (4) provide a user interface (UI) through which a user reviews the terms having a uniqueness score above a defined threshold.

12. The apparatus of claim 11 wherein the processor is further configured to sort a plurality of the terms based on their uniqueness scores.

13. The apparatus of claim 11 wherein the processor is further configured to provide a user interface (UI) through which a user provides input for adding at least one of the terms to an ontology for a natural language generation system.

14. The apparatus of claim 13 wherein the processor is further configured to, in response to user input through the provided UI, add the at least one term to the ontology as a new entity type within the ontology.

15. The apparatus of claim 14 further comprising:
the natural language generation system, wherein the natural language generation system is configured to generate a natural language output that describes a data set based on the ontology.

16. The apparatus of claim 13 wherein the processor is further configured to, in response to user input through the provided UI, add the at least one term to the ontology as a new expression for an existing entity type within the ontology.

17. The apparatus of claim 16 further comprising:
the natural language generation system, wherein the natural language generation system is configured to generate a natural language output that describes a data set based on the ontology, wherein the natural language output includes the new expression to express the existing entity type within a sentence.

18. The apparatus of claim 13 wherein the UI for adding at least one of the terms to the ontology includes fields for user entry to define a name, base type, and one or more expressions for the new entity type.

19. The apparatus of claim 11 wherein the processor comprises a plurality of processors.

20. A computer program product for applying artificial intelligence technology to natural language understanding, the computer program product comprising:
a plurality of processor-executable instructions that are resident on a non-transitory computer-readable storage medium, wherein the instructions, upon execution, are configured to cause a processor to:
from a training corpus of sentences, generate reference counts for each of a plurality of terms within the sentences of the training corpus, wherein each reference count identifies how many sentences of the training corpus that its associated term appears in;
for the sentences in the training corpus that are part of a common document, generate term frequency counts for each of a plurality of terms within the sentences of the common document, wherein each term frequency count identifies how many times that the associated term appears in the common document;
for each of a plurality of the terms, compute a score based on the reference count and the term frequency count for that term that reflects a uniqueness of that term relative to the training corpus; and provide a user interface (UI) through which a user reviews the terms having a uniqueness score above a defined threshold.

* * * * *